United States Patent
Shah et al.

(10) Patent No.: US 9,542,472 B2
(45) Date of Patent: Jan. 10, 2017

(54) FACILITATING COLLABORATION ON A RECORD AMONG A GROUP OF USERS OF A FEED-BASED ENTERPRISE NETWORK

(71) Applicant: salesforce.com, inc., San Francisco, CA (US)

(72) Inventors: Pranav Suresh Shah, San Francisco, CA (US); Sneha Sunil Khadye, San Bruno, CA (US); Joshua James Luft-Glidden, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 320 days.

(21) Appl. No.: 14/256,554

(22) Filed: Apr. 18, 2014

(65) Prior Publication Data

US 2014/0317116 A1 Oct. 23, 2014

Related U.S. Application Data

(60) Provisional application No. 61/813,910, filed on Apr. 19, 2013.

(51) Int. Cl.
*G06F 17/30* (2006.01)
*G06Q 10/10* (2012.01)
*G06Q 50/00* (2012.01)

(52) U.S. Cl.
CPC ....... *G06F 17/30598* (2013.01); *G06Q 10/101* (2013.01); *G06Q 50/01* (2013.01)

(58) Field of Classification Search
CPC .. G06Q 50/01; G06Q 10/101; G06F 17/30598
USPC ........................................................ 707/737
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |

(Continued)

OTHER PUBLICATIONS

"Google Plus Users", Google+Ripples, Oct. 31, 2011 [retrieved on Feb. 21, 2012 from Internet at http://www.googleplusers.com/google-ripples.html], 3 pages.

*Primary Examiner* — Phong Nguyen
(74) *Attorney, Agent, or Firm* — Weaver Austin Villeneuve & Sampson LLP

(57) ABSTRACT

Disclosed are some examples of systems, methods and storage media for associating a group of users to a record and facilitating collaboration on the record by the users via a group feed of an enterprise network. In some implementations, a system includes first data associating each of a plurality of group identifiers to one or more record identifiers, and second data associating each of a plurality of feed item identifiers to a respective group identifier or record identifier. In one implementation, the system is configured to receive a request for a first group feed associated with a first group identifier. Based on the request, the system identifies one or more first record identifiers associated with the first group identifier, identifies one or more first feed item identifiers associated with the first group identifier or the first record identifiers, and generates the first group feed to include the corresponding feed items.

19 Claims, 19 Drawing Sheets

(56) References Cited

U.S. PATENT DOCUMENTS

| | | |
|---|---|---|
| 5,963,953 A | 10/1999 | Cram et al. |
| 5,983,227 A | 11/1999 | Nazem et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,133 B1 | 4/2001 | Masthoff |
| 6,216,135 B1 | 4/2001 | Brodersen et al. |
| 6,233,617 B1 | 5/2001 | Rothwein et al. |
| 6,236,978 B1 | 5/2001 | Tuzhilin |
| 6,266,669 B1 | 7/2001 | Brodersen et al. |
| 6,288,717 B1 | 9/2001 | Dunkle |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,411,949 B1 | 6/2002 | Schaffer |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec et al. |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,907,566 B1 | 6/2005 | McElfresh et al. |
| 7,062,502 B1 | 6/2006 | Kesler |
| 7,069,231 B2 | 6/2006 | Cinarkaya et al. |
| 7,069,497 B1 | 6/2006 | Desai |
| 7,100,111 B2 | 8/2006 | McElfresh et al. |
| 7,181,758 B1 | 2/2007 | Chan |
| 7,269,590 B2 | 9/2007 | Hull et al. |
| 7,340,411 B2 | 3/2008 | Cook |
| 7,356,482 B2 | 4/2008 | Frankland et al. |
| 7,373,599 B2 | 5/2008 | McElfresh et al. |
| 7,401,094 B1 | 7/2008 | Kesler |
| 7,406,501 B2 | 7/2008 | Szeto et al. |
| 7,412,455 B2 | 8/2008 | Dillon |
| 7,454,509 B2 | 11/2008 | Boulter et al. |
| 7,508,789 B2 | 3/2009 | Chan |
| 7,599,935 B2 | 10/2009 | La Rotonda et al. |
| 7,603,331 B2 | 10/2009 | Tuzhilin et al. |
| 7,603,483 B2 | 10/2009 | Psounis et al. |
| 7,620,655 B2 | 11/2009 | Larsson et al. |
| 7,644,122 B2 | 1/2010 | Weyer et al. |
| 7,668,861 B2 | 2/2010 | Steven |
| 7,698,160 B2 | 4/2010 | Beaven et al. |
| 7,730,478 B2 | 6/2010 | Weissman |
| 7,747,648 B1 | 6/2010 | Kraft et al. |
| 7,779,039 B2 | 8/2010 | Weissman et al. |
| 7,779,475 B2 | 8/2010 | Jakobson et al. |
| 7,827,208 B2 | 11/2010 | Bosworth et al. |
| 7,853,881 B1 | 12/2010 | Assal et al. |
| 7,945,653 B2 | 5/2011 | Zuckerberg et al. |
| 8,005,896 B2 | 8/2011 | Cheah |
| 8,014,943 B2 | 9/2011 | Jakobson |
| 8,015,495 B2 | 9/2011 | Achacoso et al. |
| 8,032,297 B2 | 10/2011 | Jakobson |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,531 B2 | 1/2012 | Weissman et al. |
| 8,095,594 B2 | 1/2012 | Beaven et al. |
| 8,103,611 B2 | 1/2012 | Tuzhilin et al. |
| 8,150,913 B2 | 4/2012 | Cheah |
| 8,209,308 B2 | 6/2012 | Rueben et al. |
| 8,209,333 B2 | 6/2012 | Hubbard et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 2001/0044791 A1 | 11/2001 | Richter et al. |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2008/0249972 A1 | 10/2008 | Dillon |

(56) References Cited

U.S. PATENT DOCUMENTS

| | | |
|---|---|---|
| 2009/0063415 A1 | 3/2009 | Chatfield et al. |
| 2009/0100342 A1 | 4/2009 | Jakobson |
| 2009/0177744 A1 | 7/2009 | Marlow et al. |
| 2010/0076937 A1* | 3/2010 | Abdelnur ............ G06F 17/3089 707/679 |
| 2011/0113072 A1* | 5/2011 | Lee ........................ G06Q 10/10 707/802 |
| 2011/0218958 A1 | 9/2011 | Warshavsky et al. |
| 2011/0238755 A1* | 9/2011 | Khan ..................... G06Q 50/01 709/204 |
| 2011/0247051 A1 | 10/2011 | Bulumulla et al. |
| 2011/0307695 A1* | 12/2011 | Slater ................ G06F 17/30528 713/163 |
| 2011/0314029 A1* | 12/2011 | Fischer ............. G06F 17/30516 707/748 |
| 2012/0042218 A1 | 2/2012 | Cinarkaya et al. |
| 2012/0086544 A1* | 4/2012 | Kemp ................... G06F 9/5072 340/5.1 |
| 2012/0233137 A1 | 9/2012 | Jakobson et al. |
| 2012/0290407 A1 | 11/2012 | Hubbard et al. |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya et al. |
| 2014/0359537 A1 | 12/2014 | Jackobson et al. |
| 2015/0006289 A1 | 1/2015 | Jakobson et al. |
| 2015/0007050 A1 | 1/2015 | Jakobson et al. |
| 2015/0095162 A1 | 4/2015 | Jakobson et al. |
| 2015/0142596 A1 | 5/2015 | Jakobson et al. |
| 2015/0172563 A1 | 6/2015 | Jakobson et al. |

\* cited by examiner

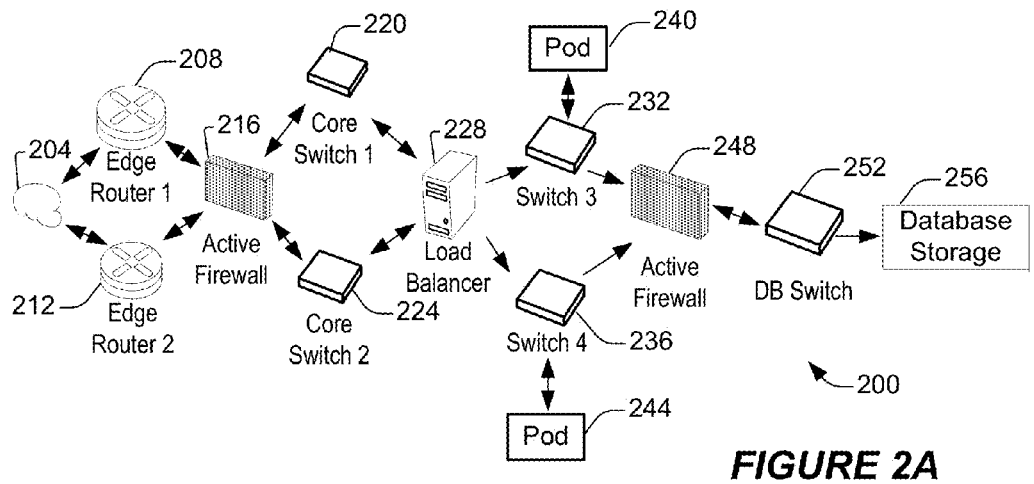
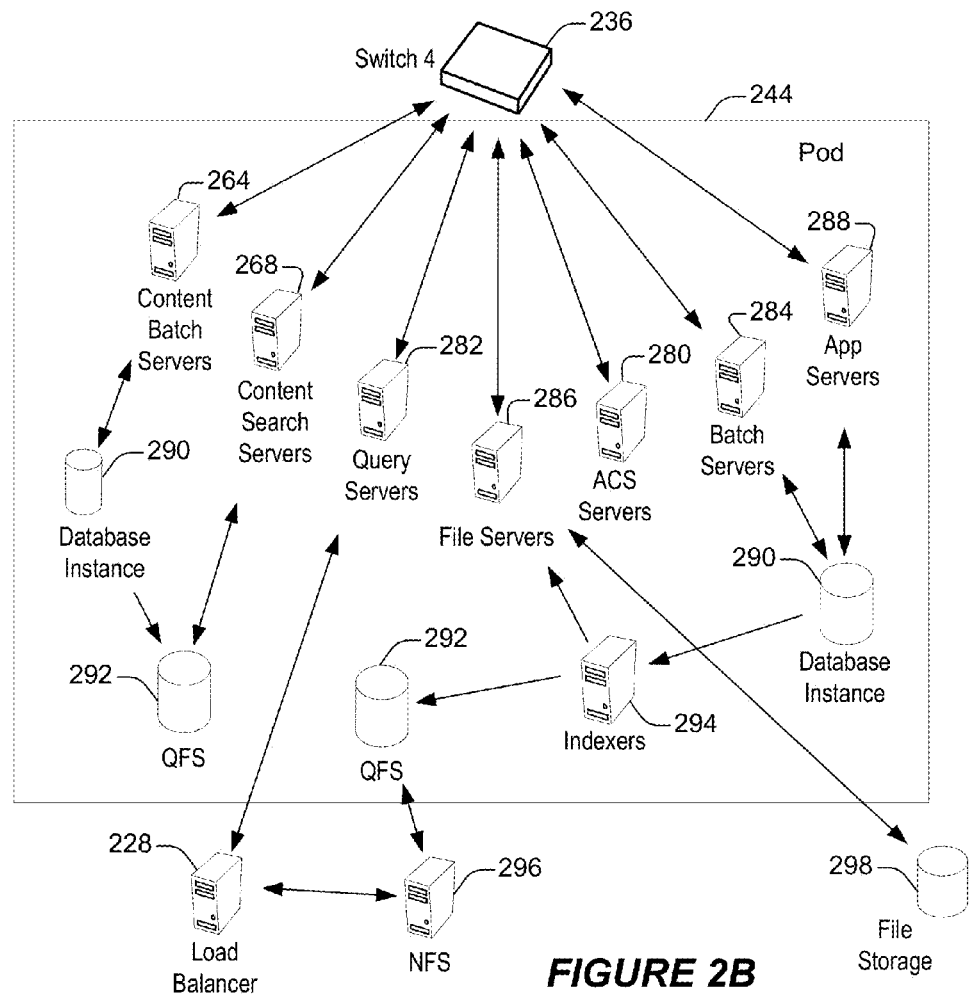
FIGURE 2A
FIGURE 2B

| | 704 | 706 | 708 | 710 | 712 | 714 | | |
|---|---|---|---|---|---|---|---|---|
| | OrgID | UserID | User Type | Name | Email | Password | | |
| 702₁ | O111 | U111 | | Dan Weber | DWeb@address.com | 112358 | | |
| 702₂ | O111 | U112 | | Bryan Hulburd | BHul@address.com | 132134 | | |
| 702₃ | O222 | U113 | | Addis Sendaba | ASend@address.com | 5589144 | | |
| 702₄ | O222 | U114 | | Tiara Cox | Tiara@address.com | 233377 | | |
| | ... | ... | ... | ... | ... | ... | ... | ... |
| 702ₙ | O333 | U999 | | Michael Redoglia | MikeR@address.com | 610987 | | |

| | OrgID | GroupID | Group Type | Name | Owner | Short Description | Long Description | ... |
|---|---|---|---|---|---|---|---|---|
| 802₁ | O111 | G111 | Public | Group A | U111 | xxxxxx | xxxxxx | |
| 802₂ | O111 | G112 | Public | Group B | U111 | xxxxxx | xxxxxx | |
| 802₃ | O111 | G113 | Private | Group C | U112 | xxxxxx | xxxxxx | |
| 802₄ | O222 | G211 | Private | Group D | U333 | xxxxxx | xxxxxx | |
| ... | ... | ... | ... | ... | ... | ... | ... | ... |
| 802ₙ | O333 | G999 | Public | Group Z | U555 | xxxxxx | xxxxxx | |

*FIGURE 8*

| | OrgID (1004) | GroupID (1006) | UserID (1008) | |
|---|---|---|---|---|
| $1002_1$ | O111 | G111 | U111 | |
| $1002_2$ | O111 | G111 | U112 | |
| $1002_3$ | O111 | G112 | U111 | |
| $1002_4$ | O222 | G211 | U223 | |
| | ⋮ | ⋮ | ⋮ | ⋮ |
| $1002_N$ | O333 | G999 | U888 | |

*FIGURE 10* — 1000

| | OrgID (1104) | RecordID (1106) | UserID (1108) | |
|---|---|---|---|---|
| $1102_1$ | O111 | R111 | U122 | |
| $1102_2$ | O111 | R312 | U111 | |
| $1102_3$ | O111 | R112 | U335 | |
| $1102_4$ | O222 | R211 | U447 | |
| | ⋮ | ⋮ | ⋮ | ⋮ |
| $1102_N$ | O333 | R999 | U765 | |

*FIGURE 11* — 1100

FACILITATING COLLABORATION ON A RECORD AMONG A GROUP OF USERS OF A FEED-BASED ENTERPRISE NETWORK

PRIORITY DATA

This patent document claims priority to commonly assigned U.S. Provisional Patent Application No. 61/813,910, titled SYSTEM AND METHOD FOR RECORD COLLABORATION IN A SOCIAL ENVIRONMENT, by Shah et al., filed on 19 Apr. 2013, which is hereby incorporated by reference in its entirety and for all purposes.

COPYRIGHT NOTICE

A portion of the disclosure of this patent document contains material which is subject to copyright protection. The copyright owner has no objection to the facsimile reproduction by anyone of the patent document or the patent disclosure, as it appears in the United States Patent and Trademark Office patent file or records, but otherwise reserves all copyright rights whatsoever.

TECHNICAL FIELD

This patent document relates generally to collaboration on a database record among a group of users of an enterprise network, and more specifically, to associations between groups of users of a feed-based enterprise network and database records.

BACKGROUND

"Cloud computing" services provide shared resources, software, and information to computers and other devices upon request. In cloud computing environments, software can be accessible over the Internet rather than installed locally on in-house computer systems. Cloud computing typically involves over-the-Internet provision of dynamically scalable and often virtualized resources. Technological details can be abstracted from the users, who no longer have need for expertise in, or control over, the technology infrastructure "in the cloud" that supports them.

Database resources can be provided in a cloud computing context. However, using existing database management techniques, it is difficult to know about the activity of other users of a database system in the cloud or other network. For example, the actions of a particular user, such as a salesperson, on a database resource may be important to the user's boss. The user can create a report about what the user has done and send it to the boss, but such reports may be inefficient, not timely, and incomplete. Also, it may be difficult to identify other users who can benefit from the information in the report.

BRIEF DESCRIPTION OF THE DRAWINGS

The included drawings are for illustrative purposes and serve to provide examples of possible structures and operations for the disclosed inventive systems, apparatus, methods and computer-readable storage media. These drawings in no way limit any changes in form and detail that may be made by one skilled in the art without departing from the spirit and scope of the disclosed implementations.

FIG. 2A shows a system diagram of example architectural components of an on-demand database service environment according to some implementations.

FIG. 2B shows a system diagram further illustrating example architectural components of an on-demand database service environment according to some implementations.

FIG. 5 shows an example of a group feed on a group page according to some implementations.

FIG. 6 shows an example of a record feed including a feed-tracked update, a post, and comments according to some implementations.

FIG. 7 shows an example of a table for storing information about users of an enterprise network according to some implementations.

FIG. 8 shows an example of a table for storing information about groups of users of an enterprise network according to some implementations.

FIG. 10 shows an example of a table for associating groups to the users subscribed to the groups according to some implementations.

FIG. 11 shows an example of a table for associating records to the users subscribed to the records according to some implementations.

DETAILED DESCRIPTION

Figure 1A:
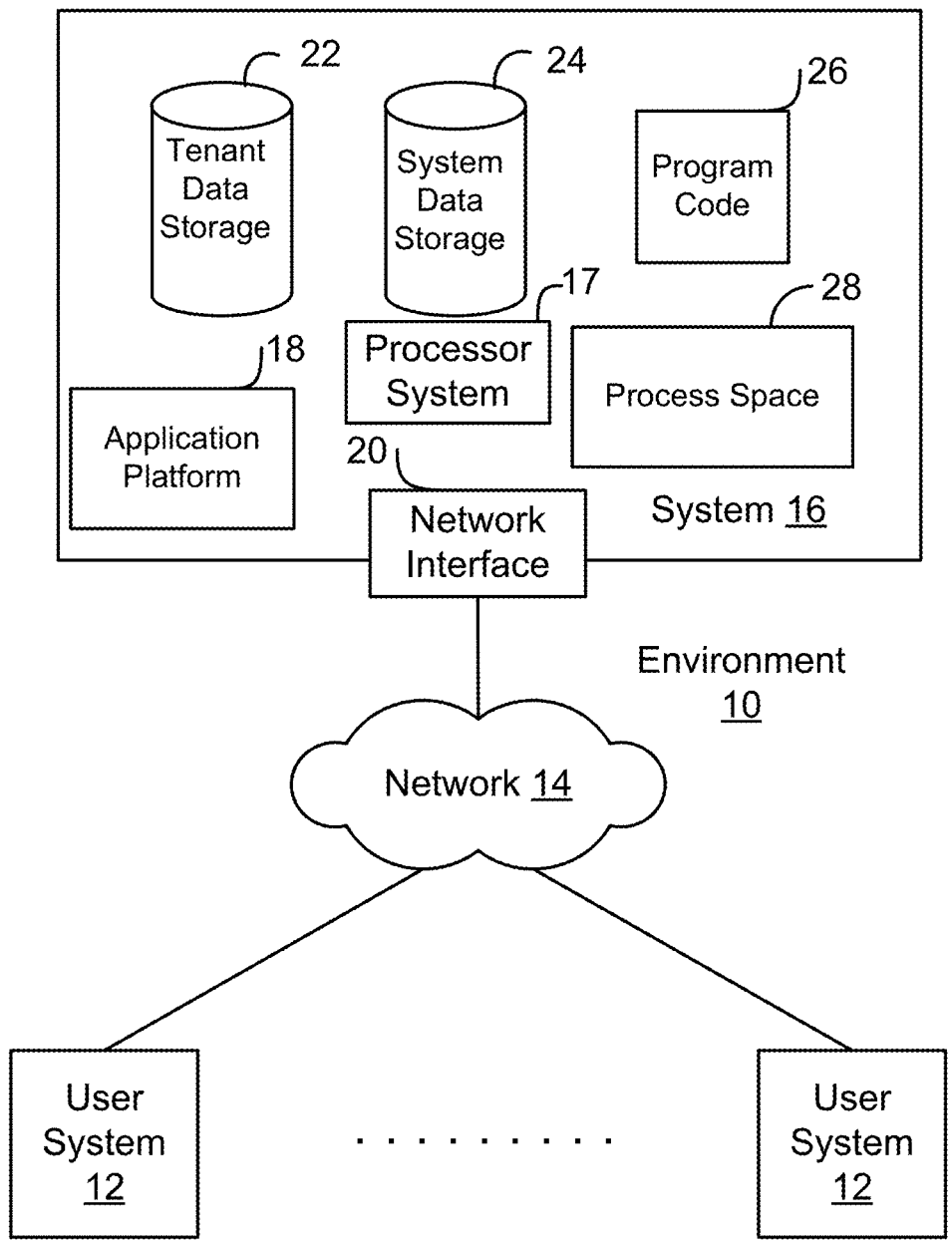
FIG. 1A shows a block diagram of an example environment in which an on-demand database service can be used according to some implementations.

Examples of systems, apparatus, computer-readable storage media, and methods according to the disclosed implementations are described in this section. These examples are being provided solely to add context and aid in the understanding of the disclosed implementations. It will thus be apparent to one skilled in the art that the disclosed implementations may be practiced without some or all of the specific details provided. In other instances, certain process or method operations, also referred to herein as "blocks," have not been described in detail in order to avoid unnecessarily obscuring the disclosed implementations. Other implementations and applications also are possible, and as such, the following examples should not be taken as definitive or limiting either in scope or setting.

In the following detailed description, references are made to the accompanying drawings, which form a part of the description and in which are shown, by way of illustration, specific implementations. Although these disclosed implementations are described in sufficient detail to enable one skilled in the art to practice the implementations, it is to be understood that these examples are not limiting, such that other implementations may be used and changes may be made to the disclosed implementations without departing from their spirit and scope. For example, the blocks of the methods shown and described herein are not necessarily performed in the order indicated in some other implementations. Additionally, in some other implementations, the disclosed methods may include more or fewer blocks than are described. As another example, some blocks described herein as separate blocks may be combined in some other implementations. Conversely, what may be described herein as a single block may be implemented in multiple blocks in some other implementations. Additionally, the conjunction "or" is intended herein in the inclusive sense where appropriate unless otherwise indicated; that is, the phrase "A, B or C" is intended to include the possibilities of "A," "B," "C," "A and B," "B and C," "A and C" and "A, B and C."

Various implementations described and referenced herein are directed to systems, apparatus, computer-implemented methods and computer-readable storage media for facilitating collaboration on a database record among a group of users of a feed-based enterprise network, and more specifically, to associating a group of users of an enterprise network to one or more records or to associating a record to one or more groups. In some implementations, a system including, for example, one or more servers or databases, maintains a data object that stores the associations between groups and records. For example, the data object can be represented, viewed or conceptualized as a table that links records to the groups associated with (for example, subscribed to) the respective records. Based on this subscription relationship, the system causes updates to the record to be published to a subscribed group's group feed, so the group follows the record.

In some implementations, the system transmits a web page to a user's computer that, when rendered by a web browser, displays an interface enabling a user to create a group. In some such implementations, when a user is creating a group in the enterprise network, that user (also referred to herein as the "group creator" or "group owner") also can use the interface to create a new record to which the group can be subscribed. The system then stores the new group, the new record and the subscription relationship between the new group and the new record. In some implementations, when a user is creating a group in the enterprise network, that user can specify or select, using the interface, one or more existing records to which to subscribe the group. In some implementations, any time after a group is created, the group owner, or in some instances any user subscribed to the group, also can specify or select one or more new or existing records to which to subscribe the group.

Similarly, in some implementations, when a user is creating a record in the enterprise network, that user (also referred to herein as the "record creator" or "record owner") also can create a group to be subscribed to the record. In some implementations, when a user is creating a record in the enterprise network, that user can specify or select one or more existing groups to be subscribed to the record. In some implementations, any time after a record is created, the record owner, or in some instances any user subscribed to the record, also can specify or select one or more new or existing groups to be subscribed to the record.

As briefly described above, various implementations described or referenced herein relate generally to subscribing groups of users of an enterprise network to a record to facilitate collaboration and the communication of relevant enterprise-related information to the users in the group subscribed to the record. Relevant enterprise-related information includes information that would be predicted or expected to benefit the enterprise by virtue of the recipients knowing the information, such as an update to a database record maintained by or on behalf of the enterprise.

In some implementations, the users described herein are users (or "members") of an interactive online "enterprise social network," also referred to herein as an "enterprise collaborative network," a "feed-based enterprise network," an "enterprise social networking system," or more simply as an "enterprise network." Such online enterprise networks are increasingly becoming a common way to facilitate communication among people, any of whom can be recognized as enterprise users. One example of an online enterprise social network is CHATTER®, provided by salesforce.com, inc. of San Francisco, Calif. salesforce.com, inc. is a provider of enterprise social networking services, customer relationship management (CRM) services and other database management services, any of which can be accessed and used in conjunction with the techniques disclosed herein in some implementations. These various services can be provided in a cloud computing environment, for example, in the context of a multi-tenant database system. Thus, the disclosed techniques can be implemented without having to install software locally, that is, on computing devices of users interacting with services available through the cloud. While the disclosed implementations are often described with reference to CHATTER®, those of ordinary skill in the art should understand that the disclosed techniques are neither limited to CHATTER® nor to any other services and systems provided by salesforce.com, inc. and can be implemented in the context of various other database systems or enterprise networking systems including enterprise networking systems that are not part of a multi-tenant database system or cloud computing system.

Some online enterprise social networks can be implemented in various settings, including business and organizations. For instance, an online enterprise social network can be implemented to connect users within an enterprise such as a business corporation, partnership or organization, or a group of users within such an enterprise. For instance, CHATTER® can be used by employee users in a division of a business organization to share data, communicate, and collaborate with each other for various enterprise-related purposes. In an example of a multi-tenant database system, each organization or a group within the organization can be a respective tenant of the system, as described in greater detail below.

In some online enterprise social networks, users can access one or more enterprise network feeds, which include publications presented as feed items or entries in the feed. Such a feed item can include a single publication or a collection of individual publications. A feed item can include various types of data including character (for example, textual)-based data, audio data, image data, video data or other data or files. A network feed can be displayed in a graphical user interface (GUI) on a display device such as the display of a computing device as described below. The publications can include various enterprise social network data from various sources and can be stored in an on-demand database service environment. In some implementations, the disclosed methods, apparatus, systems, and computer-readable storage media may be configured or designed for use in a multi-tenant database environment.

In some implementations, an online enterprise social network may allow a user to follow (or "subscribe to") data objects in the form of records such as accounts, cases, opportunities, leads, files, documents, orders, pricebooks, products, solutions, reports and forecasts, among other possibilities, in addition to following individual users and groups of users. The "following" of a record stored in a database, as described in greater detail below, allows a user to track the progress of that record and collaborate on the record with other users. Updates to the record, also referred to herein as changes to the record, are one type of publication that can occur and be noted on a network feed such as a record feed or a news feed of a user subscribed to the record. Examples of record updates include field changes in the record, updates to the status of a record, as well as the creation of the record itself. Some records are publicly accessible, such that any user can follow the record, while other records are private, for which appropriate security clearance/permissions are a prerequisite to a user following the record.

Publications can include various types of updates, which may or may not be linked with a particular record. For example, publications can be user-submitted messages or can otherwise be generated in response to user actions or in response to events. Examples of messages include: posts, comments, indications of a user's personal preferences such as "likes" and "dislikes", updates to a user's profile status, uploaded files, and user-submitted hyperlinks to enterprise social network data or other network data such as various documents or web pages on the Internet. Posts can include alpha-numeric or other character-based user inputs such as words, phrases, statements, questions, emotional expressions, or symbols. Comments generally refer to responses to posts or to other publications, such as words, phrases, statements, answers, questions, and reactionary emotional expressions or symbols. Multimedia data can be included in, linked with, or attached to a post or comment. For example, a post can include textual statements in combination with a JPEG image or animated image. A "like" or "dislike" can be submitted in response to a particular post, comment or other publication. Examples of uploaded files include presentations, documents, multimedia files, and the like.

Users can follow a record by subscribing to the record, as discussed above. Users also can follow entities such as other types of data objects, other users, and groups of users. Feed-tracked updates regarding such entities are one type of publication that can be received and included in the user's news feed (also referred to herein simply as a user's "user feed"). In some implementations, any number of users can follow a particular entity and thus view publications pertaining to that entity on the users' respective news feeds. In some online enterprise social networks, users may follow each other by establishing "links" or "connections" with each other, sometimes referred to as "friending" one another. By establishing such a link, one user may be able to see information generated by, generated about, or otherwise associated with another user. For instance, a first user may be able to see information posted by a second user to the second user's personal network page. One implementation of such a personal network page is a user's "home" or "profile" page, for example, in the form of a web page representing the user's profile. In one example, when the first user is following the second user, the first user's news feed can receive a post from the second user submitted to the second user's profile feed. A user's profile feed is also referred to herein as the user's "wall," which is one example of a network feed displayed on the user's profile page.

In some implementations, a network feed may be specific to a group of enterprise users of an online enterprise social network. For instance, a group of users may publish a news feed. Members of the group may view and post to this group feed in accordance with a permissions configuration for the feed and the group. Publications in a group context also can include changes to group status information.

In some implementations, when data such as posts or comments input from one or more enterprise users are submitted to a network feed for a particular user, group, record, object, or other construct within an online enterprise social network, an email notification or other type of network communication may be transmitted to all users following the respective user, group, record or object in addition to the inclusion of the data as a feed item in one or more feeds, such as a user's profile feed, a news feed, a group feed or a record feed. In some online enterprise social networks, the occurrence of such a notification is limited to the first instance of a published input, which may form part of a larger conversation. For instance, a notification may be transmitted for an initial post, but not for comments on the post. In some other implementations, a separate notification is transmitted for each such publication, such as a comment on a post.

Enterprise social network news feeds are different from typical consumer-facing social network news feeds (for example, FACEBOOK®) in many ways, including in the way they prioritize information. In consumer-facing social networks, the focus is generally on helping the social network users find information that they are personally interested in. But in enterprise social network services, as described above, it can be desirable from an enterprise's perspective to distribute communications such as updates to a database record to a targeted set of relevant enterprise users in situations in which the distribution of the communications to such enterprise users would benefit the enterprise by virtue of these enterprise users knowing the information contained in the communications. Thus, the meaning of relevance differs significantly in the context of a consumer-facing social network as compared with an employee-facing or organization member-facing enterprise social network.

The implementations described or referenced above and below as well as other implementations can be embodied in various types of hardware, software, firmware, or combinations thereof. For example, some techniques disclosed herein may be implemented, at least in part, by computer-readable media that include program instructions, state information, etc., for performing various services and operations described herein. Examples of program instructions include both machine- or processor-executable code, such as produced by a compiler, and files containing higher-level code that may be executed by a computing device such as a server or other data processing apparatus using an interpreter. Examples of computer-readable media include, but are not limited to, magnetic media such as hard disks, floppy disks, and magnetic tape; optical media such as CD-ROM disks; magneto-optical media; and hardware devices that are specially configured to store program instructions, such as read-only memory ("ROM") devices and random access memory ("RAM") devices. These and other features of the disclosed implementations will be described in more detail below with reference to the associated drawings.

The term "multi-tenant database system" can refer to those systems in which various elements of hardware and software of a database system may be shared by one or more customers or tenants. For example, a given application server may simultaneously process requests for a great number of customers, and a given database table may store rows of data such as feed items for a potentially much greater number of customers. The term "query plan" generally refers to one or more operations used to access information in a database system.

A "user profile" or "user's profile" is generally configured to store and maintain data about a given user of the database system. The data can include general information, such as name, title, phone number, a photo, a biographical summary, and a status (for example, text describing what the user is currently doing, thinking or expressing). As mentioned below, the data can include messages created by other users. Where there are multiple tenants, a user is typically associated with a particular tenant. For example, a user could be a salesperson of a company that is a tenant of the database system that provides a database service to the company and its employees.

The term "record" generally refers to a data entity, such as an instance of a data object created by a user of the database service, for example, about a particular (actual or potential) business relationship or project. The data object can have a data structure defined by the database service (a standard object) or defined by a user (custom object). For example, a record can be for a business partner or potential business partner (for example, a client, vendor, distributor, etc.) of the user, and can include information describing an entire company, subsidiaries, or contacts at the company. As another example, a record can be a project that the user is working on, such as an opportunity (for example, a possible sale) with an existing partner, or a project that the user is trying to get. In one implementation of a multi-tenant database system, each record for the tenants has a unique identifier stored in a common table. A record has data fields that are defined by the structure of the object (for example, fields of certain data types and purposes). A record also can have custom fields defined by a user. A field can be another record or include links to the record, thereby providing a parent-child relationship between the records.

A "group" is generally a collection of users. In some implementations, the group may be defined as users with a same or similar attribute, or by membership. In some implementations, a "group feed", also referred to herein as a "group news feed", includes one or more feed items about any user in the group. In some implementations, the group feed also includes publications and other feed items that are about the group as a whole, the group's purpose, the group's description, and group records and other objects stored in association with the group. Threads of publications including group record updates and messages, such as posts, comments, likes, etc., can define group conversations and change over time.

The terms "network feed" and "feed" are used interchangeably herein and generally refer to a combination (for example, a list) of feed items or entries with various types of information and data. Such feed items can be stored and maintained in one or more database tables, for example, as rows in the table(s), that can be accessed to retrieve relevant information to be presented as part of a displayed feed. The term "feed item" (or feed element) refers to an item of information, which can be presented in the feed such as a post submitted by a user. Feed items of information about a user can be presented in a user's profile feed of the database, feed items of information about a group can be presented in a group feed in the database, and feed items of information about a record can be presented in a record feed in the database, by way of example.

A user feed, a group feed and a record feed are examples of different network feeds. A second user following a first user, a first group, or a first record can receive the feed items associated with the first user, the first group and the first record for display in the second user's news feed, which is another type of network feed. In some implementations, the feed items from any number of followed users, groups and records can be combined into a single network feed of a particular user.

As examples, a feed item can be a message, such as a user-generated post of text data, and a "feed tracked" update to a profile, a group or a record, such as a change to a field of the record. Feed-tracked updates are described in greater detail below. A feed can be a combination of messages and feed-tracked updates. Messages include text created by a user, and may include other data as well. Examples of messages include posts, user status updates, and comments. Messages can be created for a user's profile, for a group, or for a record. Posts can be created by various users, potentially any user, although some restrictions can be applied. As an example, posts can be made to a wall section of a user's profile page (which can include a number of recent posts), a section of a group that includes multiple posts, or a section of a record that includes multiple posts. The posts can be organized in chronological order when displayed in a graphical user interface (GUI), for instance, on the user's profile page, as part of the user's profile feed. In contrast to a post, a user status update changes a status of a user and can be made by that user or an administrator. A group or a record also can have a status, the update of which can be provided by an owner of the group or the record, respectively, or other users having suitable write access permissions to the group or record. The owner can be a single user or multiple users.

In some implementations, a comment can be made on any feed item. In some implementations, comments are organized as a list explicitly tied to a particular feed item such as a feed-tracked update, post, or status update. In some implementations, comments may not be listed in the first layer (in a hierarchal sense) of feed items, but listed as a second layer branching from a particular first layer feed item.

A "feed-tracked update," also referred to herein as a "feed update," is one type of publication and generally refers to data representing an event. A feed-tracked update can include text generated by the database system in response to the event, to be provided as one or more feed items for possible inclusion in one or more feeds. In one implementation, the data can initially be stored, and then the database system can later use the data to create text for describing the event. Both the data and the text can be a feed-tracked update, as used herein. In various implementations, an event can be an update of a record and can be triggered by a specific action by a user. Which actions trigger an event can be configurable. Which events have feed-tracked updates created and which feed updates are sent to which users also can be configurable. Messages and feed updates can be stored as a field or child object of the record. For example, the feed can be stored as a child object of the record.

An "entity feed" such as a "record feed" generally refers to a feed of feed items about a particular entity such as a record in the database, such as feed-tracked updates about changes to the record and posts made by users about the record. An entity feed can be composed of any type of feed item. Such a feed can be displayed on a page such as a web page associated with the record, for example, a home page of the record. As used herein, a "profile feed" or "user's profile feed" is a feed of feed items about a particular user. In one example, the feed items for a profile feed include posts and comments that other users make about or send to the particular user, and status updates made by the particular user. Such a profile feed can be displayed on a page associated with the particular user. In another example, feed items in a profile feed could include posts made by the particular user and feed-tracked updates initiated based on actions of the particular user.

I. General Overview

Systems, apparatus, and methods are provided for implementing enterprise level social and business information collaboration and networking Such implementations can provide more efficient use of a database system. For instance, a user of a database system may not easily know when important information in the database has changed, for example, about a project or client. Implementations can provide feed-tracked updates about such changes and other events, thereby keeping users informed.

By way of example, a user can update a record in the form of a CRM object, for example, an opportunity such as a possible sale of 1000 computers. Once the record update has been made, a feed-tracked update about the record update can then automatically be provided, for example, in a feed, to anyone subscribing to the record or to the user. Thus, the user does not need to contact a manager regarding the change in the opportunity, since the feed-tracked update about the update is sent via a feed right to the manager's feed page or other page.

Next, mechanisms and methods for providing systems implementing enterprise level social and business information collaboration and networking will be described with reference to several implementations. First, an overview of an example of a database system is described. Next, examples of tracking events for a record, group or user, and messages about record, group or user or record are described. Various implementations about the data structure of feeds, customizing feeds, user selection of records, groups and users to follow, generating feeds, and displaying feeds are also described.

II. System Overview

FIG. 1A shows a block diagram of an example of an environment 10 in which an on-demand database service can be used in accordance with some implementations. Environment 10 may include user systems 12, network 14, database system 16, processor system 17, application platform 18, network interface 20, tenant data storage 22, system data storage 24, program code 26, and process space 28. In some other implementations, environment 10 may not have all of these components or may have other components instead of, or in addition to, those listed above.

Environment 10 is an environment in which an on-demand database service exists. User system 12 may be implemented as any computing device(s) or other data processing apparatus such as a machine or system that is used by a user to access a database system 16. For example, any of user systems 12 can be a handheld computing device, a mobile phone, a laptop computer, a work station, or a network of such computing devices. As illustrated in FIG. 1A (and in more detail in FIG. 1B) user systems 12 can interact via a network 14 with an on-demand database service, which is implemented in the example of FIG. 1A as database system 16.

An on-demand database service, implemented using system 16 by way of example, is a service that is made available to outside users, who do not need to necessarily be concerned with building or maintaining the database system. Instead, the database system may be available for their use when the users need the database system; that is, on the demand of the users. Some on-demand database services may store information from one or more tenants into tables of a common database image to form a multi-tenant database system (MTS). A database image may include one or more database objects. A relational database management system (RDBMS) or the equivalent may execute storage and retrieval of information against the database object(s). Application platform 18 may be a framework that allows the applications of system 16 to run, such as the hardware or software, for example, the operating system. In some implementations, application platform 18 enables creation, managing and executing one or more applications developed by the provider of the on-demand database service, users accessing the on-demand database service via user systems 12, or third party application developers accessing the on-demand database service via user systems 12.

The users of user systems 12 may differ in their respective capacities, and the capacity of a particular user system 12 can be entirely determined by permissions (permission levels) for the current user. For example, where a salesperson is using a particular user system 12 to interact with system 16, that user system has the capacities allotted to the salesperson. However, while an administrator is using that user system to interact with system 16, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level, also called authorization.

Network 14 is any network or combination of networks of devices that communicate with one another. For example, network 14 can be any one or any combination of a LAN (local area network), WAN (wide area network), telephone network, wireless network, point-to-point network, star network, token ring network, hub network, or other appropriate configuration. Network 14 can include a TCP/IP (Transfer Control Protocol and Internet Protocol) network, such as the global internetwork of networks often referred to as the "Internet" with a capital "I." The Internet will be used in many of the examples herein. However, it should be understood that the networks that the disclosed implementations can use are not so limited, although TCP/IP is a frequently implemented protocol.

User systems 12 can communicate with system 16 using TCP/IP and, at a higher network level, use other common Internet protocols to communicate, such as HTTP, FTP, AFS, WAP, etc. In an example where HTTP is used, user system 12 can include an HTTP client commonly referred to as a "browser" for sending and receiving HTTP signals to and from an HTTP server at system 16. Such an HTTP server can be implemented as the sole network interface 20 between system 16 and network 14, but other techniques can be used as well or instead. In some implementations, the network interface 20 between system 16 and network 14 includes load sharing functionality, such as round-robin HTTP request distributors to balance loads and distribute incoming HTTP requests evenly over a number of servers. At least for users accessing system 16, each of the servers has access to the MTS' data; however, other alternative configurations may be used instead.

In one implementation, system 16, shown in FIG. 1A, implements a web-based customer relationship management (CRM) system. For example, in one implementation, system 16 includes application servers configured to implement and execute CRM software applications as well as provide related data, code, forms, web pages and other information to and from user systems 12 and to store to, and retrieve from, a database system related data, objects, and Web page content. With a multi-tenant system, data for multiple tenants may be stored in the same physical database object in tenant data storage 22, however, tenant data typically is arranged in the storage medium(s) of tenant data storage 22 so that data of one tenant is kept logically separate from that of other tenants so that one tenant does not have access to another tenant's data, unless such data is expressly shared. In certain implementations, system 16 implements applications other than, or in addition to, a CRM application. For example, system 16 may provide tenant access to multiple hosted (standard and custom) applications, including a CRM application. User (or third party developer) applications, which may or may not include CRM, may be supported by the application platform 18, which manages creation, storage of the applications into one or more database objects and executing of the applications in a virtual machine in the process space of the system 16.

Figure 1B:
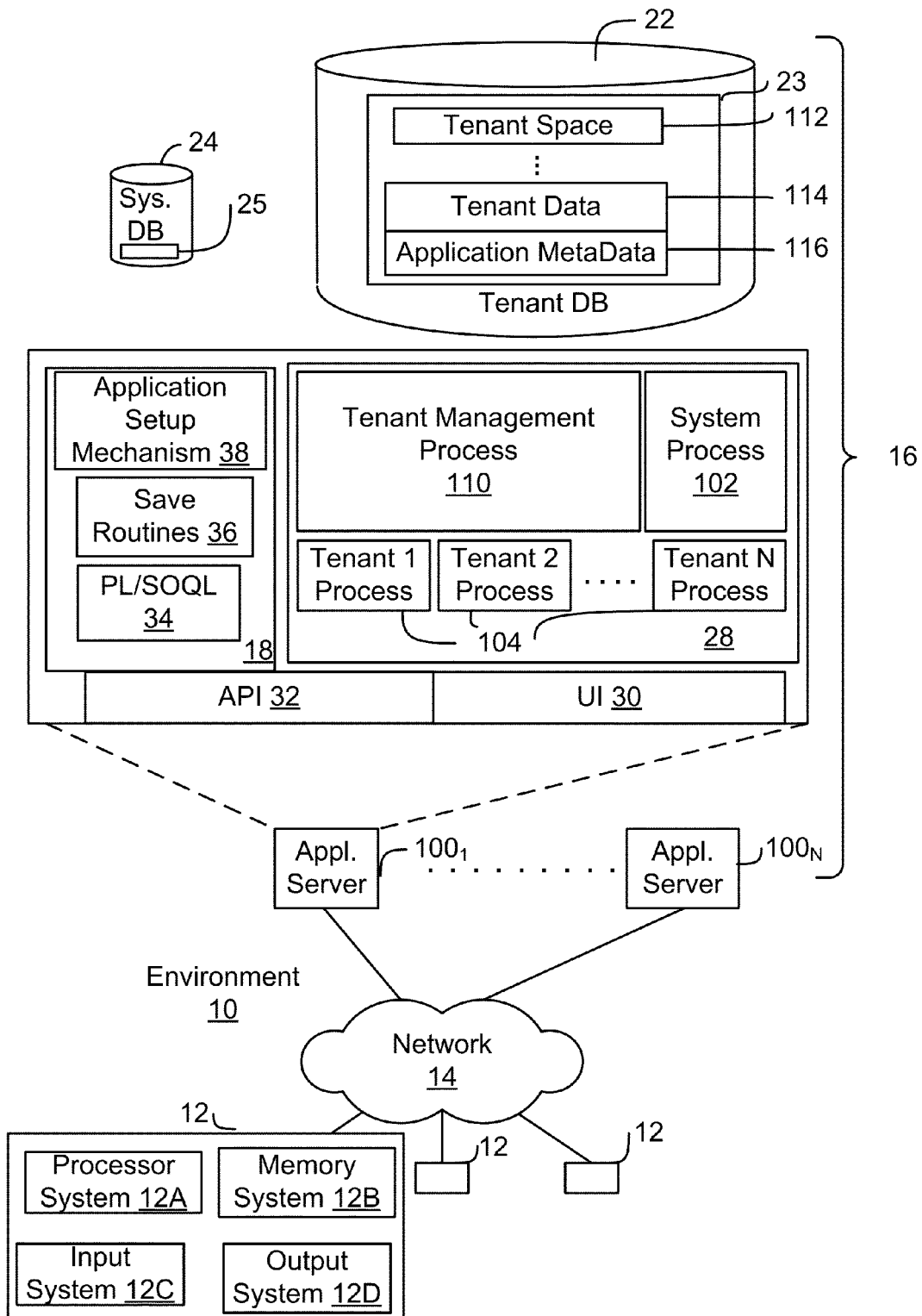
FIG. 1B shows a block diagram of example implementations of elements of FIG. 1A and example interconnections between these elements according to some implementations.

One arrangement for elements of system 16 is shown in FIGS. 1A and 1B, including a network interface 20, application platform 18, tenant data storage 22 for tenant data 23, system data storage 24 for system data 25 accessible to system 16 and possibly multiple tenants, program code 26 for implementing various functions of system 16, and a process space 28 for executing MTS system processes and tenant-specific processes, such as running applications as part of an application hosting service. Additional processes that may execute on system 16 include database indexing processes.

Several elements in the system shown in FIG. 1A include existing, well-known elements that are explained only briefly here. For example, each user system 12 could include a desktop personal computer, workstation, laptop, PDA, cell phone, or any wireless access protocol (WAP)-enabled device or any other computing device capable of interfacing directly or indirectly to the Internet or other network. The term "computing device" also is referred to herein simply as a "computer". User system 12 typically runs an HTTP client, for example, a browsing program, such as a web browser based on the WEBKIT platform, Microsoft's Internet Explorer browser, Netscape's Navigator browser, Opera's browser, Mozilla's Firefox browser, or a WAP-enabled browser in the case of a cellular phone or smartphone, PDA or other wireless device, or the like, allowing a user (for example, subscriber of the multi-tenant database system) of user system 12 to access, process and view information, pages and applications available to it from system 16 over network 14. Each user system 12 also typically includes one or more user input devices, such as a keyboard, a mouse, a trackball, a touch pad, a touch screen, a pen or stylus or the like, for interacting with a graphical user interface (GUI) provided by the browser on a display (for example, a monitor screen, liquid crystal display (LCD), light-emitting diode (LED) display, among other possibilities) of the computing device in conjunction with pages, forms, applications and other information provided by system 16 or other systems or servers. For example, the user interface device can be used to access data and applications hosted by system 16, and to perform searches on stored data, and otherwise allow a user to interact with various GUI pages that may be presented to a user. As discussed above, implementations are suitable for use with the Internet, although other networks can be used instead of or in addition to the Internet, such as an intranet, an extranet, a virtual private network (VPN), a non-TCP/IP based network, any LAN or WAN or the like.

According to some implementations, each user system 12 and all of its components are operator-configurable using applications, such as a browser, including computer code run using a central processing unit such as an Intel Pentium® processor or the like. Similarly, system 16 (and additional instances of an MTS, where more than one is present) and all of its components can be operator-configurable using application(s) including computer code to run using processor system 17, which may be implemented to include a central processing unit, which may include an Intel Pentium® processor or the like, or multiple processor units. Tangible computer-readable media can have non-transitory instructions stored thereon/in, that can be executed by or used to program a computing device to perform any of the methods of the implementations described herein. Computer program code 26 implementing instructions for operating and configuring system 16 to intercommunicate and to process web pages, applications and other data and media content as described herein is preferably downloadable and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any other type of computer-readable medium or device suitable for storing instructions or data. Additionally, the entire program code, or portions thereof, may be transmitted and downloaded from a software source over a transmission medium, for example, over the Internet, or from another server, as is well known, or transmitted over any other existing network connection as is well known (for example, extranet, VPN, LAN, etc.) using any communication medium and protocols (for example, TCP/IP, HTTP, HTTPS, Ethernet, etc.) as are well known. It will also be appreciated that computer code for the disclosed implementations can be realized in any programming language that can be executed on a client system or server or server system such as, for example, C, C++, HTML, any other markup language, Java™, JavaScript, ActiveX, any other scripting language, such as VBScript, and many other programming languages as are well known may be used. (JAVA™ is a trademark of Sun Microsystems, Inc.).

According to some implementations, each system 16 is configured to provide web pages, forms, applications, data and media content to user (client) systems 12 to support the access by user systems 12 as tenants of system 16. As such, system 16 provides security mechanisms to keep each tenant's data separate unless the data is shared. If more than one MTS is used, they may be located in close proximity to one another (for example, in a server farm located in a single building or campus), or they may be distributed at locations remote from one another (for example, one or more servers located in city A and one or more servers located in city B). As used herein, each MTS could include one or more logically or physically connected servers distributed locally or across one or more geographic locations. Additionally, the term "server" is meant to refer to a computing device or system, including processing hardware and process space(s), an associated storage medium such as a memory device or database, and, in some instances, a database application (for example, OODBMS or RDBMS) as is well known in the art. It should also be understood that "server system" and "server" are often used interchangeably herein. Similarly, the database objects described herein can be implemented as part of a single database, a distributed database, a collection of distributed databases, a database with redundant online or offline backups or other redundancies, etc., and can include a distributed database or storage network and associated processing intelligence.

FIG. 1B shows a block diagram of an example of some implementations of elements of FIG. 1A and various possible interconnections between these elements. That is, FIG. 1B also illustrates environment 10. However, in FIG. 1B, elements of system 16 and various interconnections in some implementations are illustrated with more specificity. FIG. 1B shows that user system 12 can include processor system 12A, memory system 12B, input system 12C, and output system 12D. FIG. 1B shows network 14 and system 16. FIG. 1B also shows that system 16 can include tenant data storage 22, tenant data 23, system data storage 24, system data 25, User Interface (UI) 30, Application Program Interface (API) 32, PL/SOQL 34, save routines 36, application setup mechanism 38, application servers $100_1$-$100_N$, system process space 102, tenant process spaces 104, tenant management process space 110, tenant storage space 112, user storage 114, and application metadata 116. In other implementations, environment 10 may not have the same elements as those listed above or may have other elements instead of, or in addition to, those listed above.

Regarding user system 12, processor system 12A may be any combination of one or more processors. Memory system 12B can include any combination of one or more memory devices, short term, or long term memory. Input system 12C can include any combination of input devices, such as one or more keyboards, mice, trackballs, scanners, cameras, or interfaces to networks. Output system 12D can include any combination of output devices, such as one or more monitors, printers, or interfaces to networks. As shown by FIG. 1B, system 16 also includes a network interface 20 (of FIG. 1A) implemented as a set of HTTP application servers 100, an application platform 18, tenant data storage 22, and system data storage 24. Also shown is system process space 102, including individual tenant process spaces 104 and a tenant management process space 110. Each application server 100, also referred to herein as an "app server", may be configured to communicate with tenant data storage 22 and the tenant data 23 therein, and system data storage 24 and the system data 25 therein to serve requests of user systems 12. The tenant data 23 can be divided into individual tenant storage spaces 112, which can be physically or logically arranged or divided. Within each tenant storage space 112, user storage 114 and application metadata 116 can similarly be allocated for each user. For example, a copy of a user's most recently used (MRU) items can be stored to user storage 114. Similarly, a copy of MRU items for an entire organization that is a tenant can be stored to tenant storage space 112. A UI 30 provides a user interface and an API 32 provides an application programmer interface to system 16 resident processes to users or developers at user systems 12. The tenant data and the system data can be stored in various databases, such as one or more Oracle® databases.

Application platform 18 includes an application setup mechanism 38 that supports application developers' creation and management of applications, which can be saved as metadata into tenant data storage 22 by save routines 36 for execution by subscribers as one or more tenant process spaces 104 managed by tenant management process 110 for example. Invocations to such applications can be coded using PL/SOQL 34, which provides a programming language style interface extension to API 32. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications can be detected by one or more system processes, which manage retrieving application metadata 116 for the subscriber making the invocation and executing the metadata as an application in a virtual machine.

Each application server 100 can be communicably coupled to database systems, for example, having access to system data 25 and tenant data 23, via a different network connection. For example, one application server $100_1$ can be coupled via the network 14 (for example, the Internet), another application server $100_{N-1}$ can be coupled via a direct network link, and another application server $100_N$ can be coupled by yet a different network connection. Transfer Control Protocol and Internet Protocol (TCP/IP) are examples of typical protocols that can be used for communicating between application servers 100 and the database system. However, it will be apparent to one skilled in the art that other transport protocols can be used to optimize the system depending on the network interconnect used.

In some implementations, each application server 100 is configured to handle requests for any user associated with any organization that is a tenant. Because it can be desirable to be able to add and remove application servers from the server pool at any time and for any reason, in some implementations there is no server affinity for a user or organization to a specific application server 100. In some such implementations, an interface system implementing a load balancing function (for example, an F5 Big-IP load balancer) is communicably coupled between the application servers 100 and the user systems 12 to distribute requests to the application servers 100. In one implementation, the load balancer uses a least connections algorithm to route user requests to the application servers 100. Other examples of load balancing algorithms, such as round robin and observed response time, also can be used. For example, in one implementation, three consecutive requests from the same user could hit three different application servers 100, and three requests from different users could hit the same application server 100. In this manner, by way of example, system 16 is a multi-tenant system in which system 16 handles storage of, and access to, different objects, data and applications across disparate users and organizations.

As an example of storage, one tenant can be a company that employs a sales force where each salesperson uses system 16 to manage their sales process. A user can maintain contact data, leads data, customer follow-up data, performance data, goals and progress data, etc., all applicable to that user's personal sales process (for example, in tenant data storage 22). In an example of a MTS arrangement, because all of the data and the applications to access, view, modify, report, transmit, calculate, etc., can be maintained and accessed by a user system having little or nothing more than network access, the user can manage his or her sales efforts and cycles from any of many different user systems. For example, when a salesperson is visiting a customer and the customer has Internet access in their lobby, the salesperson can obtain critical updates regarding that customer while waiting for the customer to arrive in the lobby.

While each user's data can be separate from other users' data regardless of the employers of each user, some data can be organization-wide data shared or accessible by several users or all of the users for a given organization that is a tenant. Thus, there can be some data structures managed by system 16 that are allocated at the tenant level while other data structures can be managed at the user level. Because an MTS can support multiple tenants including possible competitors, the MTS can have security protocols that keep data, applications, and application use separate. Also, because many tenants may opt for access to an MTS rather than maintain their own system, redundancy, up-time, and backup are additional functions that can be implemented in the MTS. In addition to user-specific data and tenant-specific data, system 16 also can maintain system level data usable by multiple tenants or other data. Such system level data can include industry reports, news, postings, and the like that are sharable among tenants.

In certain implementations, user systems 12 (which can be client systems) communicate with application servers 100 to request and update system-level and tenant-level data from system 16 that can involve sending one or more queries to tenant data storage 22 or system data storage 24. System 16 (for example, an application server 100 in system 16) can automatically generate one or more SQL statements (for example, one or more SQL queries) designed to access the desired information. System data storage 24 can generate query plans to access the requested data from the database.

Each database can generally be viewed as a collection of objects, such as a set of logical tables, containing data fitted into predefined or customizable categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or element of a table can contain an instance of data for each category defined by the fields. For example, a CRM database can include a table that describes a customer with fields for basic contact information such as name, address, phone number, fax number, etc. Another table can describe a purchase order, including fields for information such as customer, product, sale price, date, etc. In some multi-tenant database systems, standard entity tables can be provided for use by all tenants. For CRM database applications, such standard entities can include tables for case, account, contact, lead, and opportunity data objects, each containing pre-defined fields. It should be understood that the word "entity" also may be used interchangeably herein with "object" and "table".

In some multi-tenant database systems, tenants are allowed to create and store custom objects, or they may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in a multi-tenant database system. In certain implementations, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

FIG. 2A shows a system diagram illustrating an example of architectural components of an on-demand database service environment 200 according to some implementations. A client machine located in the cloud 204, generally referring to one or more networks in combination, as described herein, can communicate with the on-demand database service environment via one or more edge routers 208 and 212. A client machine can be any of the examples of user systems 12 described above. The edge routers can communicate with one or more core switches 220 and 224 via firewall 216. The core switches can communicate with a load balancer 228, which can distribute server load over different pods, such as the pods 240 and 244. The pods 240 and 244, which can each include one or more servers or other computing resources, can perform data processing and other operations used to provide on-demand services. Communication with the pods can be conducted via pod switches 232 and 236. Components of the on-demand database service environment can communicate with a database storage 256 via a database firewall 248 and a database switch 252.

As shown in FIGS. 2A and 2B, accessing an on-demand database service environment can involve communications transmitted among a variety of different hardware or software components. Further, the on-demand database service environment 200 is a simplified representation of an actual on-demand database service environment. For example, while only one or two devices of each type are shown in FIGS. 2A and 2B, some implementations of an on-demand database service environment can include anywhere from one to several devices of each type. Also, the on-demand database service environment need not include each device shown in FIGS. 2A and 2B, or can include additional devices not shown in FIGS. 2A and 2B.

Moreover, one or more of the devices in the on-demand database service environment 200 can be implemented on the same physical device or on different hardware. Some devices can be implemented using hardware or a combination of hardware and software. Thus, terms such as "data processing apparatus," "machine," "server" and "device" as used herein are not limited to a single hardware device, rather references to these terms can include any hardware and software configured to provide the described functionality.

The cloud 204 is intended to refer to a data network or multiple data networks, often including the Internet. Client machines located in the cloud 204 can communicate with the on-demand database service environment to access services provided by the on-demand database service environment. For example, client machines can access the on-demand database service environment to retrieve, store, edit, or process information.

In some implementations, the edge routers 208 and 212 route packets between the cloud 204 and other components of the on-demand database service environment 200. For example, the edge routers 208 and 212 can employ the Border Gateway Protocol (BGP). The BGP is the core routing protocol of the Internet. The edge routers 208 and 212 can maintain a table of IP networks or 'prefixes', which designate network reachability among autonomous systems on the Internet.

In one or more implementations, the firewall 216 can protect the inner components of the on-demand database service environment 200 from Internet traffic. The firewall 216 can block, permit, or deny access to the inner components of the on-demand database service environment 200 based upon a set of rules and other criteria. The firewall 216 can act as one or more of a packet filter, an application gateway, a stateful filter, a proxy server, or any other type of firewall.

In some implementations, the core switches 220 and 224 are high-capacity switches that transfer packets within the on-demand database service environment 200. The core switches 220 and 224 can be configured as network bridges that quickly route data between different components within the on-demand database service environment. In some implementations, the use of two or more core switches 220 and 224 can provide redundancy or reduced latency.

In some implementations, the pods 240 and 244 perform the core data processing and service functions provided by the on-demand database service environment. Each pod can include various types of hardware or software computing resources. An example of the pod architecture is discussed in greater detail with reference to FIG. 2B.

In some implementations, communication between the pods 240 and 244 is conducted via the pod switches 232 and 236. The pod switches 232 and 236 can facilitate communication between the pods 240 and 244 and client machines located in the cloud 204, for example via core switches 220 and 224. Also, the pod switches 232 and 236 may facilitate communication between the pods 240 and 244 and the database storage 256.

In some implementations, the load balancer 228 can distribute workload between the pods 240 and 244. Balancing the on-demand service requests between the pods can assist in improving the use of resources, increasing throughput, reducing response times, or reducing overhead. The load balancer 228 may include multilayer switches to analyze and forward traffic.

In some implementations, access to the database storage 256 is guarded by a database firewall 248. The database firewall 248 can act as a computer application firewall operating at the database application layer of a protocol stack. The database firewall 248 can protect the database storage 256 from application attacks such as structure query language (SQL) injection, database rootkits, and unauthorized information disclosure.

In some implementations, the database firewall 248 includes a host using one or more forms of reverse proxy services to proxy traffic before passing it to a gateway router. The database firewall 248 can inspect the contents of database traffic and block certain content or database requests. The database firewall 248 can work on the SQL application level atop the TCP/IP stack, managing applications' connection to the database or SQL management interfaces as well as intercepting and enforcing packets traveling to or from a database network or application interface.

In some implementations, communication with the database storage 256 is conducted via the database switch 252. The multi-tenant database storage 256 can include more than one hardware or software components for handling database queries. Accordingly, the database switch 252 can direct database queries transmitted by other components of the on-demand database service environment (for example, the pods 240 and 244) to the correct components within the database storage 256.

In some implementations, the database storage 256 is an on-demand database system shared by many different organizations. The on-demand database system can employ a multi-tenant approach, a virtualized approach, or any other type of database approach. An on-demand database system is discussed in greater detail with reference to FIGS. 1A and 1B.

FIG. 2B shows a system diagram further illustrating an example of architectural components of an on-demand database service environment according to some implementations. The pod 244 can be used to render services to a user of the on-demand database service environment 200. In some implementations, each pod includes a variety of servers or other systems. The pod 244 includes one or more content batch servers 264, content search servers 268, query servers 282, file force servers 286, access control system (ACS) servers 280, batch servers 284, and app servers 288. The pod 244 also can include database instances 290, quick file systems (QFS) 292, and indexers 294. In some implementations, some or all communication between the servers in the pod 244 can be transmitted via the switch 236.

In some implementations, the app servers 288 include a hardware or software framework dedicated to the execution of procedures (for example, programs, routines, scripts) for supporting the construction of applications provided by the on-demand database service environment 200 via the pod 244. In some implementations, the hardware or software framework of an app server 288 is configured to execute operations of the services described herein, including performance of the blocks of methods described with reference to FIGS. 3-20. In some alternative implementations, two or more app servers 288 can be included and cooperate to perform such methods, or one or more other servers described herein can be configured to perform the disclosed methods.

The content batch servers 264 can handle requests internal to the pod. Some such requests can be long-running or not tied to a particular customer. For example, the content batch servers 264 can handle requests related to log mining, cleanup work, and maintenance tasks.

The content search servers 268 can provide query and indexer functions. For example, the functions provided by the content search servers 268 can allow users to search through content stored in the on-demand database service environment.

The file force servers 286 can manage requests for information stored in the Fileforce storage 298. The Fileforce storage 298 can store information such as documents, images, and basic large objects (BLOBs). By managing requests for information using the file force servers 286, the image footprint on the database can be reduced.

The query servers 282 can be used to retrieve information from one or more file systems. For example, the query system 282 can receive requests for information from the app servers 288 and transmit information queries to the NFS 296 located outside the pod.

The pod 244 can share a database instance 290 configured as a multi-tenant environment in which different organizations share access to the same database. Additionally, services rendered by the pod 244 may call upon various hardware or software resources. In some implementations, the ACS servers 280 control access to data, hardware resources, or software resources.

In some implementations, the batch servers 284 process batch jobs, which are used to run tasks at specified times. For example, the batch servers 284 can transmit instructions to other servers, such as the app servers 288, to trigger the batch jobs.

In some implementations, the QFS 292 is an open source file system available from Sun Microsystems® of Santa Clara, Calif. The QFS can serve as a rapid-access file system for storing and accessing information available within the pod 244. The QFS 292 can support some volume management capabilities, allowing many disks to be grouped together into a file system. File system metadata can be kept on a separate set of disks, which can be useful for streaming applications where long disk seeks cannot be tolerated. Thus, the QFS system can communicate with one or more content search servers 268 or indexers 294 to identify, retrieve, move, or update data stored in the network file systems 296 or other storage systems.

In some implementations, one or more query servers 282 communicate with the NFS 296 to retrieve or update information stored outside of the pod 244. The NFS 296 can allow servers located in the pod 244 to access information to access files over a network in a manner similar to how local storage is accessed.

In some implementations, queries from the query servers 222 are transmitted to the NFS 296 via the load balancer 228, which can distribute resource requests over various resources available in the on-demand database service environment. The NFS 296 also can communicate with the QFS 292 to update the information stored on the NFS 296 or to provide information to the QFS 292 for use by servers located within the pod 244.

In some implementations, the pod includes one or more database instances 290. The database instance 290 can transmit information to the QFS 292. When information is transmitted to the QFS, it can be available for use by servers within the pod 244 without using an additional database call.

In some implementations, database information is transmitted to the indexer 294. Indexer 294 can provide an index of information available in the database 290 or QFS 292. The index information can be provided to file force servers 286 or the QFS 292.

III. Tracking Updates to a Record Stored in a Database

As multiple users can be able to change the data of a record, it can be useful for certain users to be notified when a record is updated. Also, even if a user does not have authority to change a record, the user still may desire to know when there is an update to the record. For example, a vendor may negotiate a new price with a salesperson of company X, where the salesperson is a user associated with tenant Y. As part of creating a new invoice or for accounting purposes, the salesperson can change the price saved in the database. It can be important for co-workers to know that the price has changed. While the salesperson could send an email to certain people, this is onerous and the salesperson may not email all of the people who need to know or want to know; that is, those who would find the communication relevant. Accordingly, some implementations of CHATTER® can inform others (for example, co-workers) who desire to know about an update to a record automatically.

Figure 3:
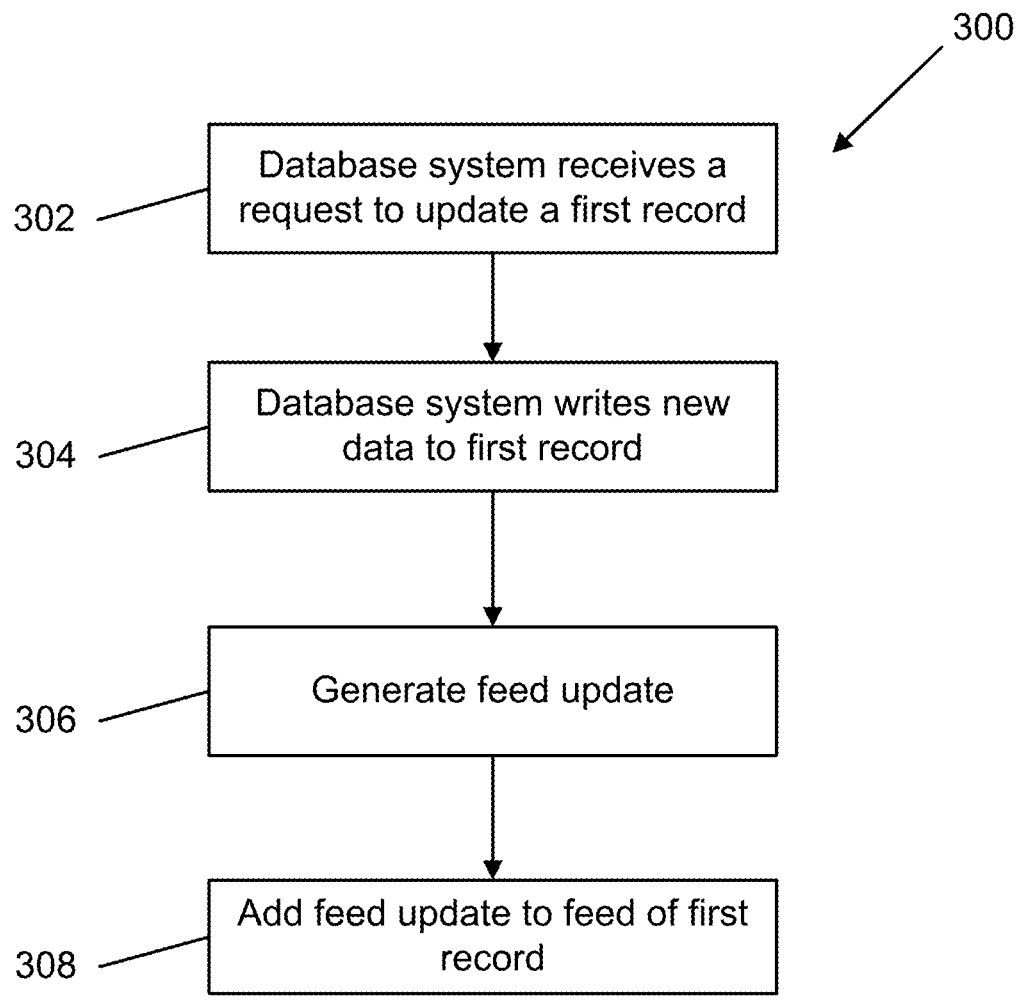
FIG. 3 shows a flowchart of an example method for tracking updates to a record stored in a database system according to some implementations.

FIG. 3 shows a flowchart of an example method 300 for tracking updates to a record stored in a database system according to some implementations. Method 300 (and other methods described herein) can be implemented at least partially with multi-tenant database system 16, for example, by one or more processors configured to receive or retrieve information, process the information, store results, and transmit the results. In some other implementations, the method 300 can be implemented at least partially with a single tenant database system. In various implementations, blocks may be reordered, omitted, combined, or split into additional blocks for method 300, as well as for other methods described herein.

In block 302, the database system receives a request to update a first record. In some implementations, the request is received from a first user. For example, a user may be accessing a page associated with the first record, and may change a displayed field and select or "click" save. In another implementation, the database system can automatically create the request. For instance, the database system can create the request in response to another event, for example, a request to change a field can be sent periodically at a particular date or time of day, or a change to another field or object. The database system can obtain a new value based on other fields of a record or based on parameters in the system.

The request for the update of a field of a record is an example of an event associated with the first record for which a feed-tracked update can be created. In some other implementations, the database system can identify other events besides updates to fields of a record for which to create a feed-tracked update. For example, an event can be a submission of approval to change a field. Such an event also can have an associated field (for example, a field showing a status of whether a change has been submitted). Other examples of events can include creation of a record, deletion of a record, converting a record from one type or status to another (for example, converting a lead to an opportunity), closing a record (for example, a case type record), and potentially any other state or status change of a record—any of which can include a field change associated with the state or status change. Any of these events can update the record by changing a field of the record, a state of the record, or some other characteristic or property of the record. In some implementations, a list of supported events for creating a feed-tracked update can be maintained within the database system, for example, in a server or in a database.

In block 304, the database system writes new data to the first record. In some implementations, the new data includes a new value that replaces old data. For example, a field can be updated with a new value. In another implementation, the new data can be a value for a field that did not contain data before. In yet another implementation, the new data can be a flag, for example, for a status of the record, which can be stored as a field of the record.

In some implementations, a "field" also can include records, which are child objects of the first record in a parent-child hierarchy. A field can additionally or alternatively include a pointer to a child record. A child object itself can include further fields. Thus, if a field of a child object is updated with a new value, the parent record also can be considered to have a field changed. In one example, a field can be a list of related child objects, also called a related list.

In block 306, a feed-tracked update is generated about the update to the record. In some implementations, the feed-tracked update is created in parts for assembling later into a display version. For example, event entries can be created and tracked in a first table, and changed field entries can be tracked in another table that is cross-referenced with the first table. In another implementation, the feed-tracked update is automatically generated by the database system. The feed-tracked update can convey in words that the first record has been updated and provide details about what was updated in the record and who performed the update. In some implementations, a feed-tracked update is generated for only certain types of events or updates associated with the first record.

In block 308, the feed-tracked update is added to a feed for the first record. In some implementations, adding the feed-tracked update to a feed can include adding events to a table (which may be specific to a record or be for all or a group of objects), where a display version of a feed-tracked update can be generated dynamically and presented in a GUI as a feed item when a user requests (or the system 16 requests based on an input or action of the user) a feed for the first record. In another implementation, a display version of a feed-tracked update can be added when a record feed is stored and maintained for a record. As described above, in some cases a feed may be maintained for only certain records. In some implementations, the feed of a record can be stored in the database associated with the record. For example, the feed can be stored as a field (for example, as a child object) of the record. Such a field can store a pointer to the text to be displayed for the feed-tracked update.

IV. Tracking Actions of a User

In addition to knowing about events associated with a particular record, it can be helpful for a user to know what a particular user is doing. In particular, it can be desirable or convenient to know what the user is doing without the user having to generate the feed-tracked update (for example, a user submitting a synopsis of what the user has done). Accordingly, implementations can automatically track actions of a user that trigger events, and feed-tracked updates can be generated for certain events.

Figure 4:
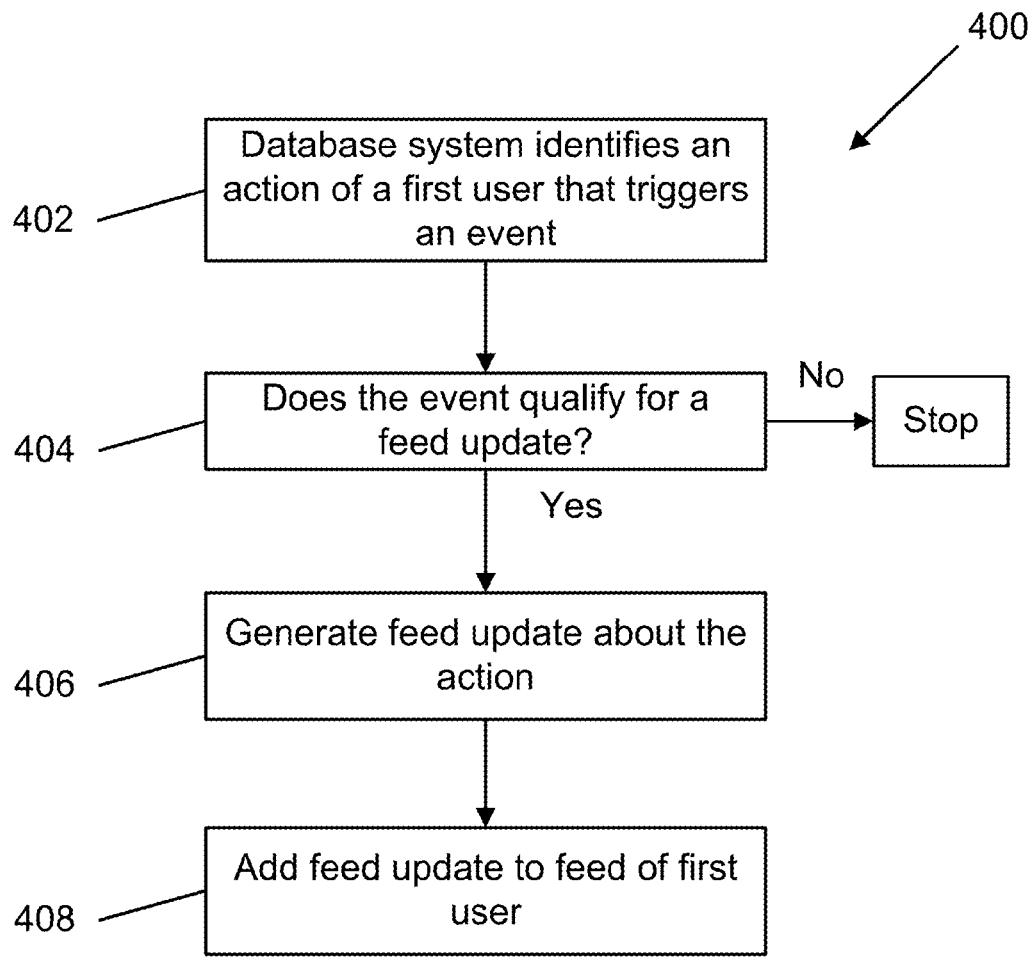
FIG. 4 shows a flowchart of an example method for tracking actions of a user of a database system according to some implementations.

FIG. 4 shows a flowchart of an example method 400 for tracking actions of a user of a database system according to some implementations. The method 400 can be performed in addition to the method 300. The operations of the method 300, including the order of blocks, can be performed in conjunction with the method 400 and other methods described herein. Thus, a feed can be composed of changes to a record and actions of users.

In block 402, a database system (for example, 16 of FIGS. 1A and 1B) identifies an action of a first user. In some implementations, the action triggers an event, and the event is identified. For example, the action of a user requesting an update to a record can be identified, where the event is receiving a request or is the resulting update of a record. The action can thus be defined by the resulting event. In some implementations, only certain types of actions (events) are identified. Which actions are identified can be set as a default or can be configurable by a tenant, or even configurable at a user level. In this way, processing effort can be reduced since only some actions are identified.

In block 404, the system determines whether the event qualifies for a feed-tracked update. For example, a predefined list of events (for example, as mentioned herein) can be created so that only certain actions are identified. As another example, an administrator (or other user) of a tenant can specify the type of actions (events) for which a feed-tracked update is to be generated. This block also can be performed for the method 300.

In block 406, a feed-tracked update is generated about the action. In an example where the action is an update of a record, the feed-tracked update can be similar to or the same as the feed-tracked update created for the record. The description can be altered to focus on the user as opposed to the record. For example, "John D. has closed a new opportunity for account XYZ" as opposed to "an opportunity has been closed for account XYZ." In block 408, the feed-tracked update is added to a news feed of the first user.

V. Generation of a Feed-Tracked Update

As described above, some implementations can generate text describing events (for example, updates) that have occurred for a record and actions by a user that trigger an event. A database system can be configured to generate the feed-tracked updates for various events in various ways.

In some implementations, the feed-tracked update is a grammatical sentence, being easily understandable by a person. In another implementation, the feed-tracked update provides detailed information about the update. In various examples, an old value and new value for a field can be included in the feed-tracked update, an action for the update can be provided (for example, submitted for approval), and the names of particular users that are responsible for replying or acting on the feed-tracked update also can be provided. The feed-tracked update also can have a level of importance based on settings chosen by the administrator, a particular user requesting an update, or by a following user who is to receive the feed-tracked update, which fields is updated, a percentage of the change in a field, the type of event, or any combination of these factors.

In some implementations, the system includes a set of heuristics for creating a feed-tracked update from the event (for example, a request to update). For example, the subject may be the user, the record, or a field being added or changed. The verb can be based on the action requested by the user, which can be selected from a list of verbs (which may be provided as defaults or input by an administrator of a tenant). In some implementations, feed-tracked updates can be generic containers with formatting restrictions.

One example of a feed-tracked update for the creation of a new record can be, "Mark Abramowitz created a new Opportunity for IBM-20,000 laptops with Amount as $3.5M and Sam Palmisano as Decision Maker." This event can be posted to the profile feed for Mark Abramowitz and the entity feed (record feed) for the record of Opportunity for IBM-20,000 laptops. The pattern can be given by (AgentFullName) created a new (ObjectName)(RecordName) with [(FieldName) as (FieldValue) [, / and]]*[[added/changed/removed] (RelatedListRecordName) [as / to / as] (RelatedListRecordValue) [, / and]]. Similar patterns can be formed for a changed field (standard or custom) and an added child record to a related list.

VI. Tracking Commentary from or about a User

As described above, in some implementations, a user can submit user-generated messages including text, instead of or in addition to the database system generating a feed-tracked update. As the text can be submitted as part or all of a message by a user, the text can be about any topic. Thus, more information than just actions of a user and events of a record can be conveyed. In some implementations, the messages can be used to ask a question about a particular record, and users following the record can provide comments and responses.

In some implementations, all or most feed-tracked updates can be commented on. In some implementations, feed-tracked updates for certain records are not commentable. In various implementations, comments can be made for any one or more records of opportunities, accounts, contacts, leads, and custom objects. In some implementations, users can rate feed-tracked updates or messages (including comments). The order of the feed items displayed in a user feed, group feed or record feed on a particular user's, group's or record's page, respectively, can be chronological or be based on a relevance value or other prioritization scheme, which can be determined by the database system using various factors or specified by a user.

Figure 5:
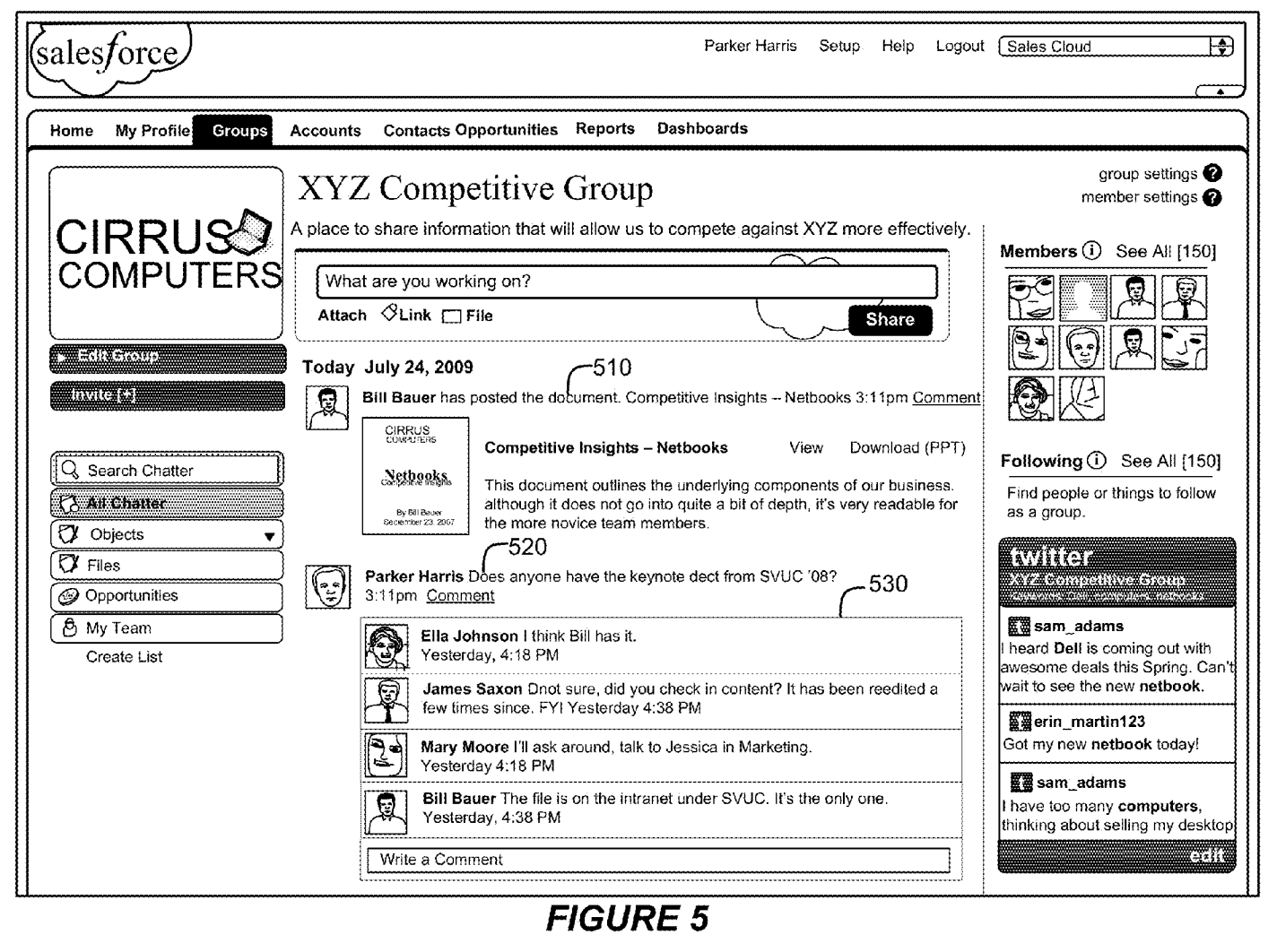

FIG. 5 shows an example of a group feed on a group page according to some implementations. As shown, a feed item 510 shows that a user has posted a document to the group feed. The text "Bill Bauer has posted the document Competitive Insights" can be generated by the database system in a similar manner as feed-tracked updates about a record being changed. A feed item 520 shows a post to the group, along with comments 630 from Ella Johnson, James Saxon, Mary Moore and Bill Bauer.

Figure 6:
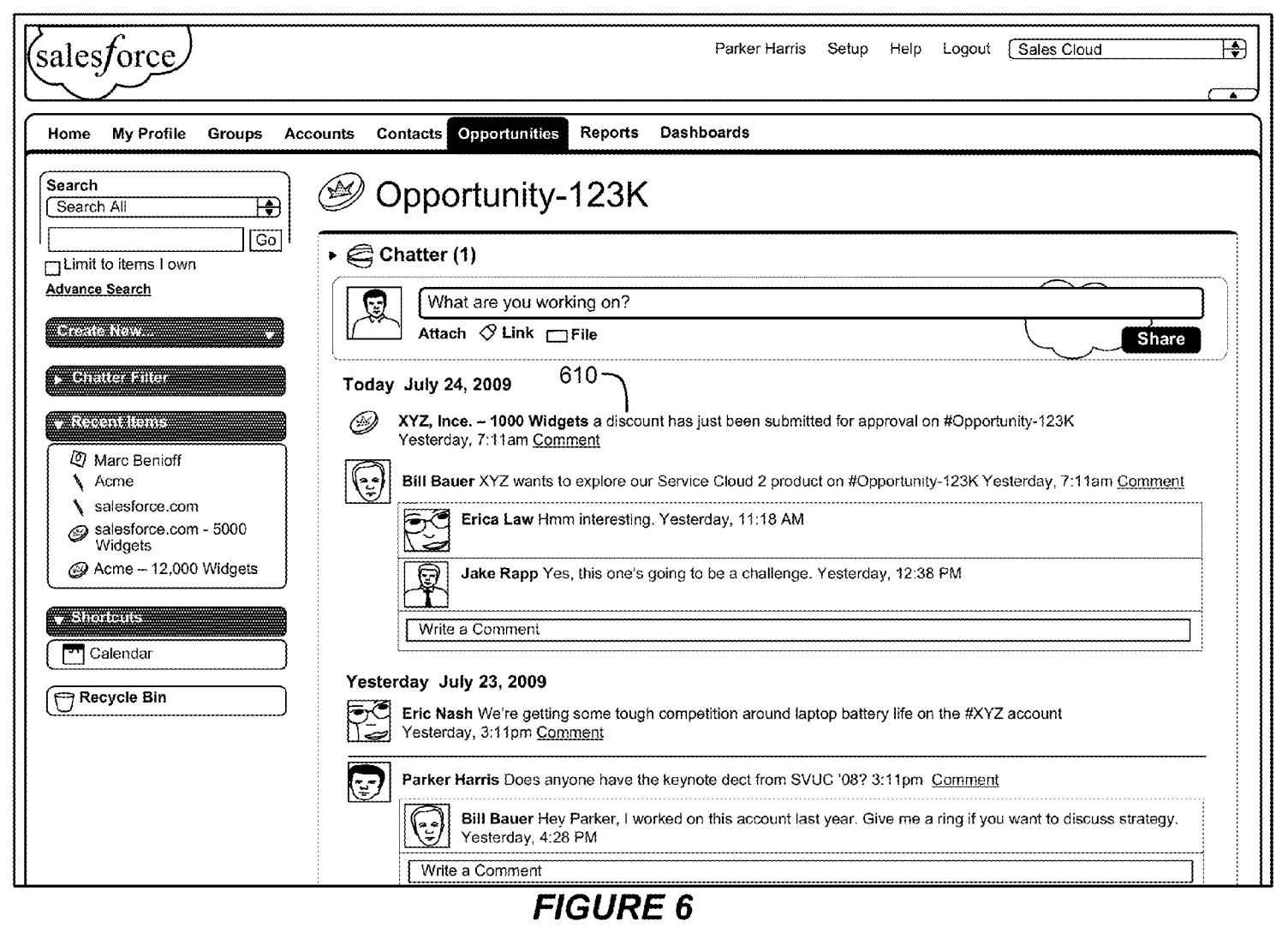

FIG. 6 shows an example of a record feed containing a feed-tracked update, post, and comments according to some implementations. Feed item 610 shows a feed-tracked update based on the event of submitting a discount for approval. Other feed items show posts, for example, from Bill Bauer, made to the record and comments, for example, from Erica Law and Jake Rapp, made on the posts.

VII. Example of a Database Architecture

As described above, the database system 16 can store enterprise data and CRM data. In some such implementations, data is stored in the form of "entity objects" (also referred to herein simply as "entities"). In some implementations, entities are categorized into "Records objects" and "Collaboration objects." In some such implementations, the Records object includes all records in the enterprise social network. Each record can be considered a sub-object of the overarching Records object. As described above, records can include, for example, accounts, cases, opportunities, leads, files, documents, orders, pricebooks, products, solutions, reports and forecasts, among other possibilities. In some implementations, Collaboration objects include, for example, a "Users object," a "Groups object," a "Group-User relationship object," a "Record-User relationship object," a "Feed Items object," and a "Group-Record relationship object."

In some implementations, the Users object is a data structure that can be represented or conceptualized as a "Users Table" that associates users to information about or pertaining to the respective users including, for example, metadata about the users. In some implementations, the Users Table includes all of the users within an organization. In some other implementations, there can be a Users Table for each division, department, team or other sub-organization within an organization. In implementations in which the organization is a tenant of a multi-tenant enterprise social network platform, the Users Table can include all of the users within all of the organizations that are tenants of the multi-tenant enterprise social network platform. In some such implementations, each organization or enterprise (used interchangeably herein) has a unique organization identifier ("OrgID"). FIG. 7 shows an example of a Users Table 700 for storing information about users of an enterprise network according to some implementations. In some such implementations, each row $702_1$-$702_N$ of the Users Table 700 represents a unique user. Each row can include an OrgID in a first column 704, a user identifier ("UserID") in a second column 706 that is unique at least within the respective organization or enterprise identified by the OrgID, and various information about the user in one or more additional columns. For example, a third column 708 can include an identification of a user type (for example, a standard user or a portal user), a fourth column 710 can include the user's actual name or screen name, a fifth column 712 can include the user's email address, and a sixth column 714 can include a password. In some alternative implementations, these or additional columns can include other information about or pertaining to the users.

In some implementations, the Groups object is a data structure that can be represented or conceptualized as a "Groups Table" that associates groups to information about or pertaining to the respective groups including, for example, metadata about the groups. In some implementations, the Groups Table includes all of the groups within the organization. In some other implementations, there can be a Groups Table for each division, department, team or other sub-organization within an organization. In implementations in which the organization is a tenant of a multi-tenant enterprise social network platform, the Groups Table can include all of the groups within all of the organizations that are tenants of the multitenant enterprise social network platform. FIG. 8 shows an example of a Groups Table 800 for storing information about groups of users of an enterprise network according to some implementations. In some such implementations, each row $802_1$-$802_N$ of the Groups Table 800 represents a unique group. Each row can include an OrgID in a first column 804, a group identifier ("GroupID") in a second column 806 that is unique at least within the respective organization or enterprise identified by the OrgID, and various information about the group in one or more additional columns. For example, a third column 808 can include a group type (for example, an identification of whether the group is public or private), a fourth column 810 can include a name or title of the group, a fifth column 812 can include a UserID associated with the owner of the group (for example, the user that created the group), a sixth column 814 can include information about the group (for example, a short description of a membership characteristic such as a purpose, objective or other relating quality of the members), and a seventh column 816 can include a description of the group (for example, a longer description of the group's purpose or objective and membership characteristics). In some implementations, the information or description can include clickable or otherwise selectable textual or other user interface (UI) elements (for example, hyperlinks) that direct the user to the respective page associated with the selected element. In some alternative implementations, these or additional columns can include other information about or pertaining to the groups.

As described above, groups can have various visibilities to users within an enterprise social network. For example, some groups can be private (a private-type group) while others can be public (a public-type group). In some implementations, to become a member within a private group, and thus to have access to publish and view feed items on the group's feed, a user must request to be subscribed to the group (and accepted by, for example, an administrator or owner of the group), be invited to subscribe to the group (and accept), or be directly subscribed to the group (for example, by an administrator or owner of the group). In some implementations, any user within the enterprise social network can subscribe to or follow a public group (and thus become a "member" of the public group) within the enterprise social network. In some implementations, there are only two group types: public and private. In some other implementations, there can be a new group type—a "collaboration" group type—which can be, for example, indicated in the third column 808 or in another column. For example, in the latter case, some public groups can be collaboration groups while other public groups are not, and similarly, some private groups can be collaboration groups while other private groups are not. But in other implementations, such as in some implementations described below, there isn't a third "collaboration" group type. Rather, the Group-Record Table 1300 described below identifies those groups, whether private or public, that are recognized as collaboration groups because of their association with one or more records.

Figure 9:
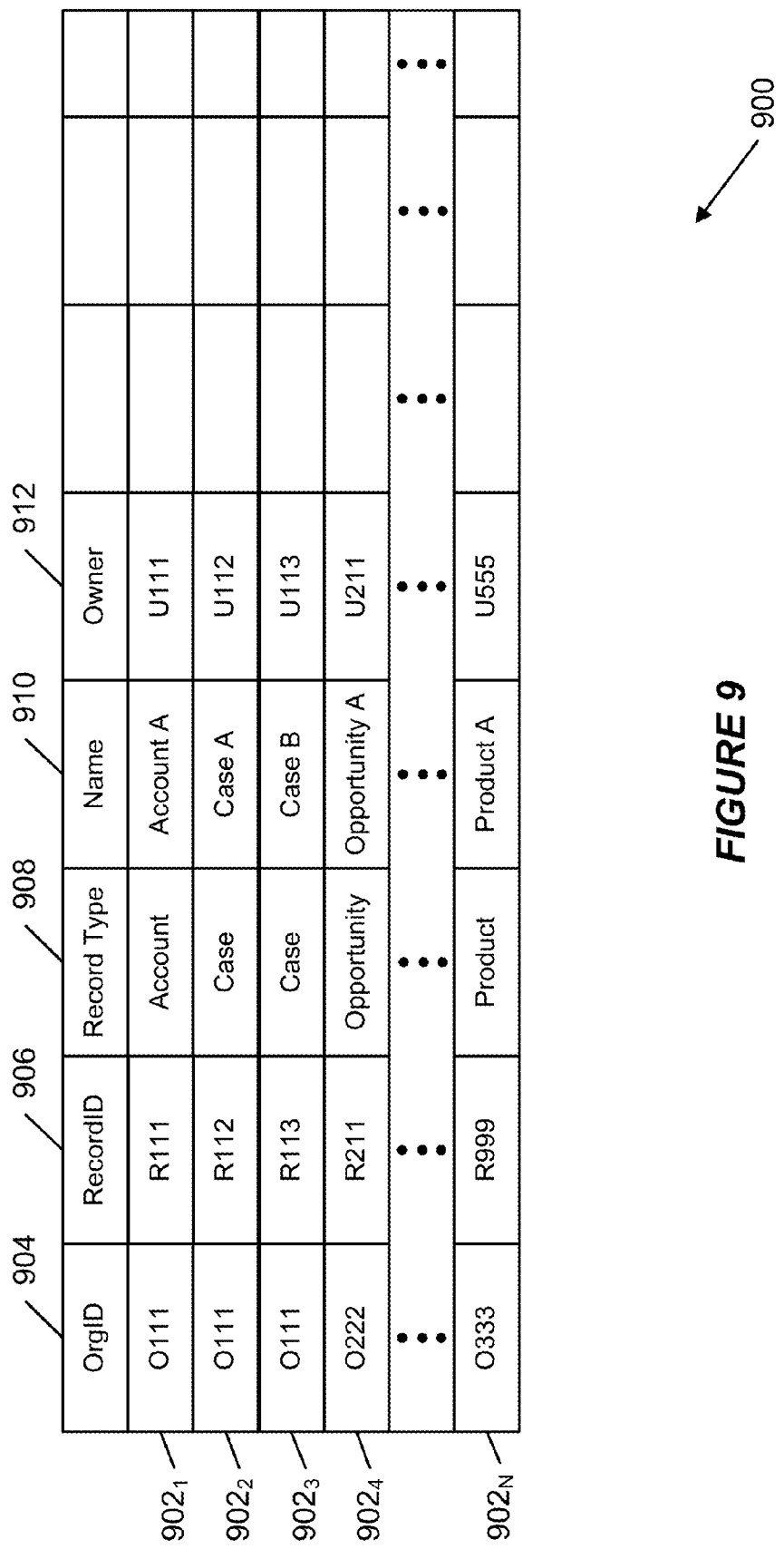
FIG. 9 shows an example of a table for storing information about records within an enterprise network according to some implementations.

In some implementations, the Records object is a data structure that can be represented or conceptualized as a "Records Table" that associates records to information about or pertaining to the respective records including, for example, metadata about the records. In some implementations, the Records Table includes all of the records within the organization. In some other implementations, there can be a Records Table for each division, department, team or other sub-organization within an organization. In implementations in which the organization is a tenant of a multi-tenant enterprise social network platform, the Records Table can include all of the records within all of the organizations that are tenants of the multitenant enterprise social network platform. FIG. 9 shows an example of a Records Table 900 for storing information about records within an enterprise network according to some implementations. In some such implementations, each row $902_1$-$902_N$ of the Records Table 900 represents a unique record. Each row can include an OrgID in a first column 904, a record identifier ("RecordID") in a second column 906 that is unique at least within the respective organization or enterprise identified by the OrgID, and various information about the record in one or more additional columns. For example, a third column 908 can include a record type, a fourth column 910 can include a name or title of the record and a fifth column 912 can include the owner or creator of the record. In some alternative implementations, these or additional columns can include other information about or pertaining to the records.

In some implementations, the database system 16 includes a "Group-User relationship object." The Group-User relationship object is a data structure that can be represented or conceptualized as a "Group-User Table" that associates groups to users subscribed to the respective groups. In some implementations, the Group-User Table includes all of the groups within the organization. In some other implementations, there can be a Group-User Table for each division, department, team or other sub-organization within an organization. In implementations in which the organization is a tenant of a multi-tenant enterprise social network platform, the Group-User Table can include all of the groups within all of the organizations that are tenants of the multitenant enterprise social network platform. FIG. 10 shows an example of a Group-User Table 1000 for associating groups to the users subscribed to the groups according to some implementations. In some such implementations, each row $1002_1$-$1002_N$ of the Group-User Table 1000 represents a defined relationship, association, link or subscription (all of which are used interchangeably herein where appropriate) between a particular group and a user subscribed to the group. Each row can include an OrgID in a first column 1002, a GroupID in a second column 1006, and a UserID in a third column 1008. Thus, each row defines a subscription relationship in which the user identified by the UserID in the third column 1008 is subscribed to the group identified by the GroupID in the second column 1006, and in which the group identified by the GroupID in the second column 1006 is within the organization identified by the OrgID in the first column 1004 of the same row. In some alternative implementations, additional columns can include other information about or pertaining to the subscriptions between the users and groups.

In some implementations, the database system 16 includes a "Record-User relationship object." The Record-User relationship object is a data structure that can be represented or conceptualized as a "Record-User Table" that associates records to users subscribed to the respective records. In some implementations, the Record-User Table includes all of the records within the organization. In some other implementations, there can be a Record-User Table for each division, department, team or other sub-organization within an organization. In implementations in which the organization is a tenant of a multi-tenant enterprise social network platform, the Record-User Table can include all of the records within all of the organizations that are tenants of the multitenant enterprise social network platform. FIG. 11 shows an example of a Record-User Table 1100 for associating records to the users subscribed to the records according to some implementations. In some such implementations, each row $1102_1$-$1102_N$ of the Record-User Table 1100 represents a subscription between a particular record and a user subscribed to the record. Each row can include an OrgID in a first column 1104, a RecordID in a second column 1106, and a UserID in a third column 1108. Thus, each row defines a subscription relationship in which the user identified by the UserID in the third column 1108 is subscribed to the record identified by the RecordID in the second column 1106, and in which the record identified by the RecordID in the second column 1106 is within the organization identified by the OrgID in the first column 1104 of the same row. In some alternative implementations, additional columns can include other information about or pertaining to the subscriptions between the users and records.

Figure 12:
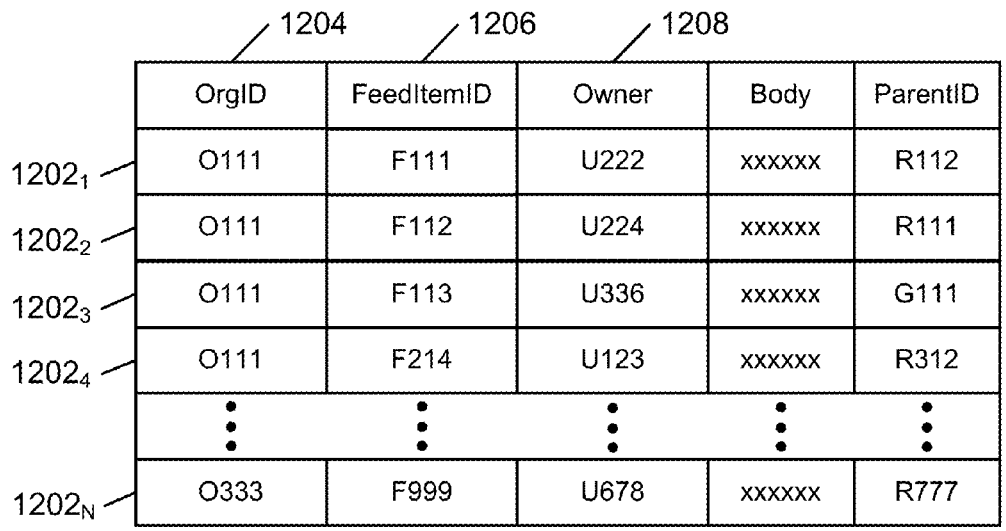
FIG. 12 shows an example of a table for storing information about feed items according to some implementations.

In some implementations, the database system 16 includes a "Feed Items object." The Feed items object is a data structure that can be represented or conceptualized as a "Feed Items Table" that associates users, records and groups to posts, comments, documents or other publications to be displayed as feed items in the respective user feeds, record feeds and group feeds, respectively. In some implementations, the Feed Items Table includes all of the feed items within the organization. In some other implementations, there can be a Feed Items Table for each division, department, team or other sub-organization within an organization. In implementations in which the organization is a tenant of a multi-tenant enterprise social network platform, the Feed Items Table can include all of the feed items within all of the organizations that are tenants of the multitenant enterprise social network platform. FIG. 12 shows an example of a Feed Items Table 1200 for storing information about feed items according to some implementations. In some such implementations, each row $1202_1$-$1202_N$ of the Feed Items Table 1200 represents a defined relationship or link between a particular feed item and an associated user, record or group. Each row can include an OrgID in a first column 1204, a FeedItemID in a second column 1206, a UserID of the user that is the owner of the feed item (for example, the user that submitted the post associated with the feed item) in a third column 1208, and a feed item body in a fourth column 1210. That is, in some implementations, each row is associated with a particular post and the particular post is uniquely identified by the respective FeedItemID. The feed item body includes the text or other information in the post. In some implementations, a ParentID can be specified in a fifth column 1212. The ParentID can include, for example, the UserID, RecordID or Group ID corresponding to the user feed, record feed or group feed where the post was submitted. Another column can include a timestamp associated with a time the post was submitted. Various other columns can include CommentIDs or other identifiers of documents, files or other publications to be attached or displayed with the post as part of the feed item. In some alternative implementations, these or additional columns can include other information about or pertaining to the feed items.

VIII. Associating Groups with Records

As described above, in some implementations, each group has a respective group feed including feed items submitted by users belonging, following or subscribing to the group ("group members"). In some existing architectures, a group feed only displays feed items for publications submitted to the respective group feed by the group members. Similarly, as described above, each record also can have a respective record feed including feed items such as posts and related comments, as well as documents and other publications submitted by users, some of whom may subscribe to the record and others of whom do not. As described above, users also can have respective user feeds that display feed items submitted by the user or by other users that follow the user, or vice versa. A user's news feed also can display feed items from the group feeds of the respective groups the user subscribes to, as well as feed items from the record feeds of the respective records the user subscribes to.

Various implementations relate to a system that provides an interface that enables a group creator or administrator to select, enter or otherwise specify one or more new or existing records to be subscribed to by the group being created. The system then stores the new group, the new record (if newly created), and the subscription relationship between the new group and the record. Various implementations also relate to a system that provides an interface that enables a user subscribed to the group to add records to be subscribed to by the group at any subsequent time after the group is created. The system then stores the subscription relationship between the group and each added record. Various implementations also relate to a system that provides an interface that enables a record creator or administrator to select, enter or otherwise specify one or more new or existing groups to be subscribed to the record being created or to specify one or more groups to be subscribed to an existing record. The system then stores the subscription relationship between the record and the subscribed group. In some implementations, based on the subscription relationships between a group and one or more records, the system creates a group page that includes a section that lists the records subscribed to by the group. Additionally, the group feed of the group subscribed to the records will include not only those feed items resulting from publications submitted by group members directly to the group's group feed, but will also include all feed items resulting from publications submitted by the group members to the record feeds of the respective records subscribed to by the group. And collaboration by group members on one or several records is streamlined because all group members can collaborate on all of the records subscribed to by the group via the group's group feed rather than have to switch among several different record feeds while also ensuring that all relevant feed items for the records are included in the group feed.

Figure 13:
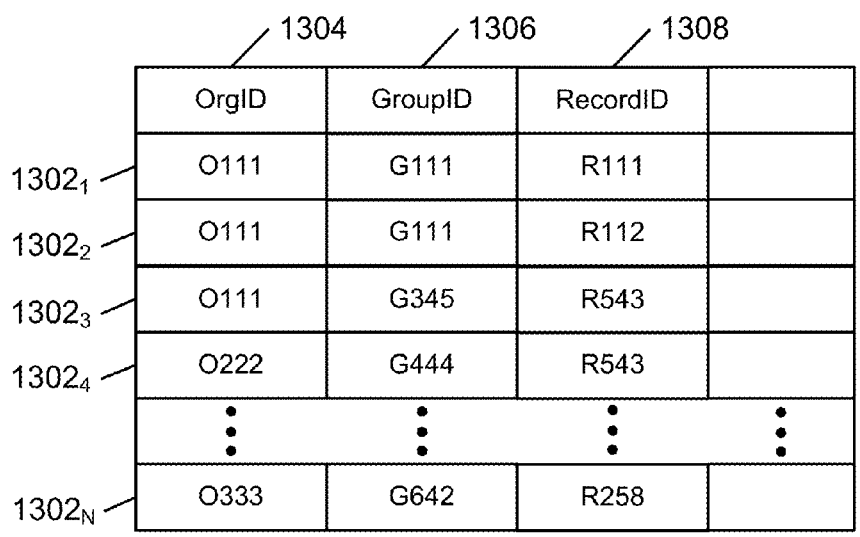
FIG. 13 shows an example of a table for associating records to the groups subscribed to the records according to some implementations.

In some implementations, the database system 16 of FIGS. 1A and 1B further includes a "Group-Record relationship object." The Group-Record relationship object is a data structure that can be represented or conceptualized as a "Group-Record Table" that associates groups to records associated with, linked with, or subscribed to by the respective groups. In some implementations, the Group-Record Table includes all of the GroupIDs of the groups that have associated records, as well as all of the associated records (or more specifically the RecordIDs of the records), within the organization. In some other implementations, there can be a Group-Record Table for each division, department, team or other sub-organization within an organization. And in implementations in which the organization is a tenant of a multi-tenant enterprise social network platform, the Group-Record Table can include all of the groups and associated records within all of the organizations that are tenants of the multitenant enterprise social network platform. FIG. 13 shows an example of a Group-Record Table 1300 for associating records to the groups subscribed to the records according to some implementations. In some such implementations, each row $1302_1$-$1302_N$ of the Group-Record Table 1300 represents a defined relationship between a particular group and a record the group subscribes to. Each row can include an OrgID in a first column 1304, a GroupID in a second column 1306, and a RecordID in a third column 1308. Thus, each row defines an association in which the record identified by the RecordID in the third column 1308 is subscribed to by the group identified by the GroupID in the second column 1306, and in which the group identified by the GroupID in the second column 1306 is within the organization identified by the OrgID in the first column 1304 of the same row. In some alternative implementations, additional columns can include other information about or pertaining to the subscriptions between the groups and the records.

Thus, in some implementations, the group-record subscription can be the same or similar to the group-user subscriptions and record-user subscriptions described herein. But rather than users being subscribed to groups or subscribed to records, in a group-record subscription, a group as a whole is subscribed to a record. In this way, in some implementations, a group can be dedicated to collaborating on one or more records. As just described, one group can be subscribed to one or multiple records. Similarly, in some implementations, one record can be subscribed to by one or multiple groups. In some such implementations, although a record can be subscribed to by several groups, only those feed items resulting from posts, comments, documents, or other communications or updates published or caused by members within a given group are displayed to the respective members of the group in the group's group feed or in the individual group members' user feeds; that is, although more than one group may be subscribed to a particular record, the publications submitted by members of each group on the group's group feed or the subscribed records' record feeds are only displayed to other members of the respective group and not to the other members of the other groups or individual users subscribing to the record. In some other implementations in which a record is subscribed to by several groups, all the feed items resulting from posts, comments, documents, or other communications or updates published or caused by members of all the groups subscribed to the record are displayed to all members of all the groups subscribed to the record in the groups' respective group feeds or in the individual group members' user feeds. In yet other implementations in which a record is subscribed to by several groups, all or a subset of the feed items resulting from posts, comments, documents, or other communications or updates published or caused by members of all or a subset of the groups subscribed to the record can be displayed to all or a subset of the members of all or a subset of the subscribed groups in the groups' respective group feeds or in the individual group members' user feeds. In some implementations, a group creator can select to have the associated group feed include feed items resulting only from the group's members' publications, or to have the associated group feed include feed items from all or selected ones of the other groups or other individual users subscribed to the record. In some implementations, a group creator can select to have the associated group feed include feed items resulting from all or selected ones of the records subscribed to by the group.

Figure 14:
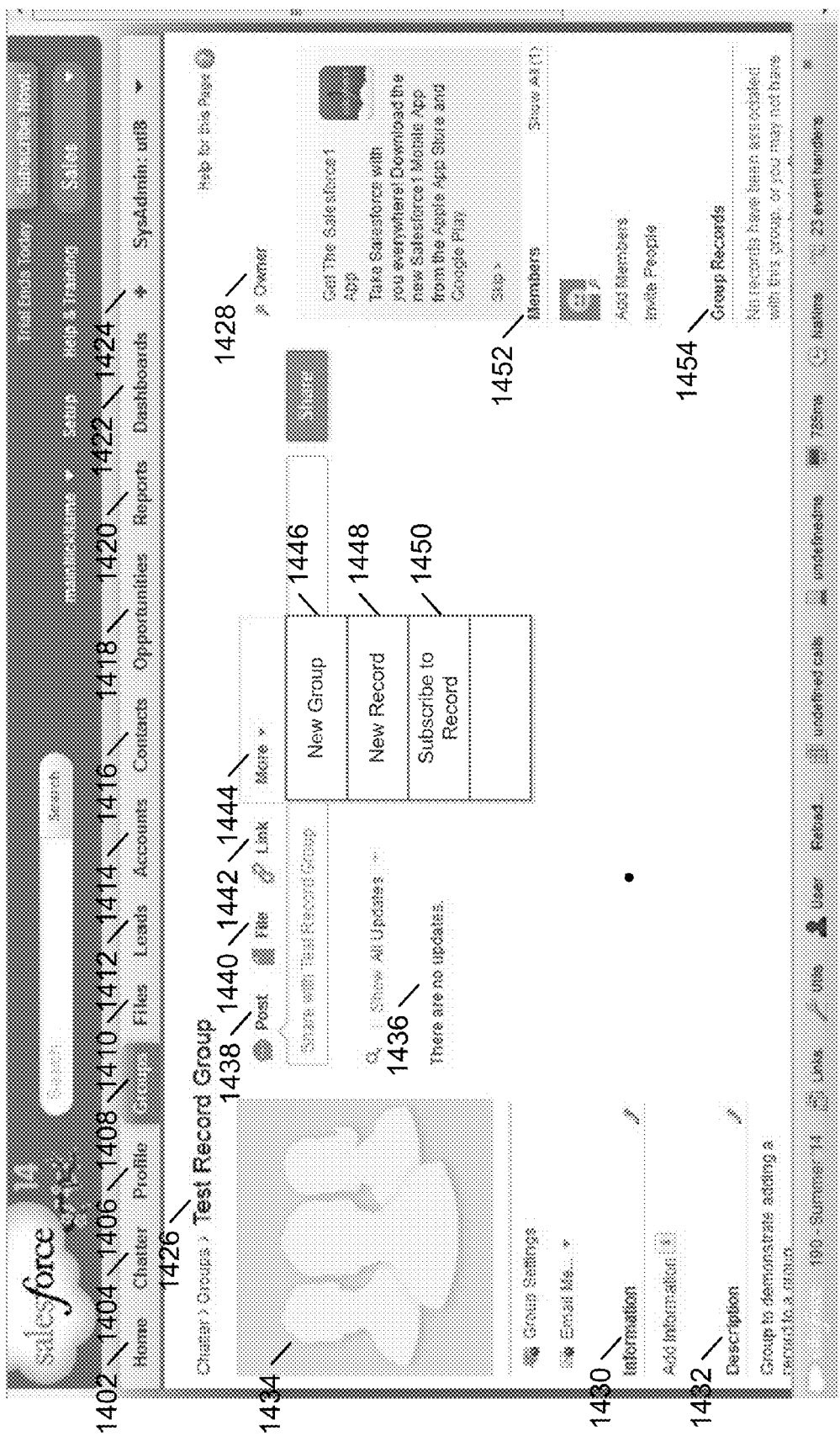
FIG. 14 shows an example of an interface for interacting with an enterprise social network according to some implementations.

FIG. 14 shows an example of a web page interface 1400 for interacting with an enterprise social network according to some implementations. For example, the database system 16 can create the web page interface and transmit it to a user's computer (for example, as an HTML structured document) over one or more networks for rendering by a web browser or other rendering engine executing with the user's computer. The interface 1400 includes tabs for accessing various information or data. For example, the interface 1400 can include a Home tab 1402 that, when clicked or otherwise selected, opens the user's home page in a section or area below the tabs. The interface 1400 also can include a Chatter® tab 1404 that, when clicked or otherwise selected displays Chatter®-related information in a section or area below the tabs. The interface 1400 also can include a Profile tab 1406 that, when clicked or otherwise selected, opens the user's profile page in a section or area below the tabs. The interface 1400 also can include a Groups tab 1408 that, when clicked or otherwise selected (as is the case in FIG. 14), opens a page displaying various information or UI elements for a group or groups in a section or area below the tabs. The interface 1400 also can include a Files tab 1410 that, when clicked or otherwise selected, opens a page displaying various information or UI elements associated with the file records the user owns or is subscribed to in a section or area below the tabs. The interface 1400 also can include a Leads tab 1412 that, when clicked or otherwise selected, opens a page displaying various information or UI elements associated with the lead records the user owns or is subscribed to in a section or area below the tabs. The interface 1400 also can include an Accounts tab 1414 that, when clicked or otherwise selected, opens a page displaying various information or UI elements associated with the account records the user owns or is subscribed to in a section or area below the tabs. The interface 1400 also can include a Contacts tab 1416 that, when clicked or otherwise selected, opens a page displaying various information or UI elements associated with contacts the user communicates with using the enterprise social network (in some implementations, the contacts are third-party contacts that are not registered users of the enterprise social network, and as such, are not included in the Users Table described above). The interface 1400 also can include a Opportunities tab 1418 that, when clicked or otherwise selected, opens a page displaying various information or UI elements associated with the opportunity records the user owns or is subscribed to in a section or area below the tabs. The interface 1400 also can include a Reports tab 1420 that, when clicked or otherwise selected, opens a page displaying various information or UI elements associated with reports or report records the user has generated, owns or is subscribed to in a section or area below the tabs. The interface 1400 also can include a Dashboard tab 1422 that, when clicked or otherwise selected, opens a page displaying various information or UI elements associated with an overview of the user's collaborative activity or inner network of users, groups or records the user is subscribed to in a section or area below the tabs. The interface 1400 also can include a "+" tab 1424 that, when clicked or otherwise selected, opens a new tab which can be customized by the user and configured to, when clicked or otherwise selected, display various other information or UI elements associated with other records or other information of interest.

As just described, the Groups tab 1408 has been selected in FIG. 14. In the illustrated example and implementation, the interface 1400 displays a group page for the group "Test Record Group." The name or title of the group—Test Record Group—is shown in section 1426. As described above, the name or title of the group can be specified in column 810 of the Groups Table 800. Also shown is the user's relationship to the group—for example "Owner"—in section 1428. As described above, the UserID associated with the owner of the group can be specified in column 812 of the Groups Table 800. Also shown is an information section 1430 that can be populated with the information (or short description of the group), for example, when the group is initially created or by later clicking or selecting the "Add Information" link in the Information section 1430. As described above, the short description in the Information section 1430 can be specified in column 814 of the Groups Table 800. Also shown is a Description section 1432 that can be populated with a longer description of the group, for example, when the group is initially created or by later clicking or selecting an "Add Description" link in the Description section 1432. In the illustrated example, the description of the Test Record Group states, "Group to demonstrate adding a record to a group." As described above, the description in the Description section 1432 can be specified in column 816 of the Groups Table 800.

The interface also can include a picture or avatar in section 1434 that can display a picture or avatar associated with the user when the Home tab 1402 or Profile tab 1406 tabs are selected. When the Groups tab 1408 is selected, or a particular group selectable via the Groups tab 1408 is selected, section 1434 can instead display a picture or avatar associated with the group (for example, the Test Record Group as is the case in FIG. 14). Similarly, when other tabs such as the Files tab 1410, Leads tab 1412, Accounts tab 1414, or Opportunities tab 1418 are selected, section 1434 can instead display a picture or avatar associated with the selected file, lead, account or opportunity, respectively. Additionally, depending on which of the tabs described above is selected, a feed (for example, a user feed, a group feed or a record feed) can be displayed in a section 1436 (in the example shown in FIG. 18, the group Test Record Feed is a new group and the group feed which would display feed items has none to display).

Additionally, depending on which of the tabs described above is selected, one or more tabs, "buttons" or other UI elements can be selected to facilitate collaboration. For example, a "Post" button 1438 allows a user interacting with the interface 1400 to submit a post that will be uploaded and published at least to the feed 1436 associated with the selected one of the tabs described above. Similarly, a "File" button 1440 allows a user to submit a file, and a "Link" button 1442 allows a user to submit a link such as a URL or other address (note that this instance of the term "link" is not to be used interchangeably with the terms "subscription," "association," or "following" or other derivations or conjugations of these terms as described above), all of which can be uploaded and published at least to the feed 1436 associated with the selected one of the tabs described above. Furthermore, a "More" button 1444 can allow a user to perform or cause other actions. For example, upon a user selecting the More button 1444, a drop-down menu or pick list can be displayed below, next to, or in some other section of the interface 1400.

In some implementations, the pick list includes a "New Group" button or tab 1446 that allows a user to create a new group. For example, upon selecting the New Group button 1446, the user could be navigated to a new interface (or, alternatively, a pop-up window can be displayed in the interface 1400) enabling the user to specify details about the group, for example, a group type (for example, public or private), name, information (short description), and description (longer description), which would be subsequently stored by the database system 16 in, for example, the Groups Table 800 as described above. In some implementations, the group creator also can upload or select a picture. In some implementation the group creator also can directly add other users to be subscribed to the group when creating the group. In some implementations, after the group is created, the group creator or an administrator can add members to the group using a "Members" section 1452 of the interface 1400. For example, a user could click or select an "Add Members" button or an "Invite People" button as shown in the Members section 1452. In some such implementations, upon selecting the Add Members button, a new interface or a pop-up window within the interface 1400 is displayed that enables the user to search for an existing user or to select from a pick list of existing users. In some implementations, the Members section 1452 also displays a list of the users subscribed to the group. In some implementations, the list include a list of hyperlinks that, when clicked or selected, takes the user to the user profile associated with the user selected in the Members section 1452.

In some implementations, the group creator also can directly add one or more new or existing records to be subscribed to by the group when creating the group. In some implementations, after the group is created, the group creator, an administrator or any group member can add new or existing records to the group using the Group Records section 1454 of the interface 1400. For example, a user could click or select an Add Records button (not shown) that could be displayed in the Group Records section 1454. In some such implementations, upon selecting the Add Records button, a new interface or a pop-up window within the interface 1400 is displayed that enables the user to create a new record or to search for an existing record or to select from a pick list of existing records. For example, a pop-up window could allow a user to select a record type, and then enter text (for example, the record name) to search for the desired record, or to select a record from a pick list of records of that record type. In some implementations, the Group Records section 1454 also displays a list of all records subscribed to by the group. In some implementations, the list include a list of hyperlinks that, when clicked or selected, takes the user to the record profile associated with the record selected in the Group Records section 1454.

Additionally or alternatively, in some implementations, the group creator or any group member also can directly create a new record to be subscribed to by the group after the group is created. In some implementations, after the group is created, the group creator or an administrator or any group member can create a new record by selecting a "New Record" button or tab 1448. For example, upon selecting the New Record button 1448, the user could be navigated to a new interface (or, alternatively, a pop-up window can be displayed in the interface 1400) enabling the user to specify details about the record, for example, a record type, name, and other information about or pertaining to the record. In some implementations, the user can specify whether or not to subscribe the new record with the group. The new record would subsequently be stored by the database system 16 in, for example, the Records Table 900 as described above.

Additionally or alternatively, in some implementations, the group creator or any group member also can directly add one or more existing records to be subscribed to by the group after the group is created. In some implementations, after the group is created, the group creator or an administrator or any group member can add an existing record by selecting the "Subscribe to Record" button or tab 1450. For example, upon selecting the Subscribe to Record button 1450, the user could be navigated to a new interface (or, alternatively, a pop-up window can be displayed in the interface 1400) enabling the user to search for an existing record or to select from a pick list of existing records. For example, a pop-up window could allow a user to select a record type, and then enter text (for example, the record name) to search for the desired record, or to select a record from a pick list of records of that record type.

Figure 15:
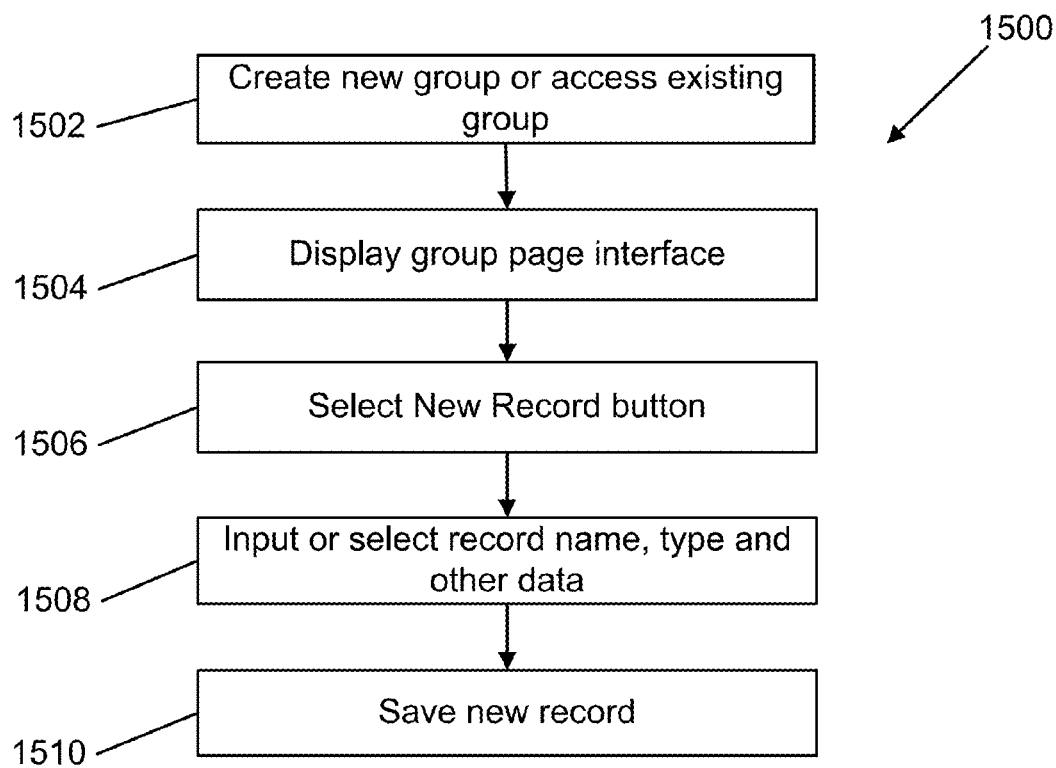
FIG. 15 shows a flowchart of an example of a computer-implemented method for associating a group of users of an enterprise network to a record according to some implementations.

FIG. 15 shows a flowchart of an example of a computer-implemented method 1500 for associating a group of users of an enterprise network to a record according to some implementations. The method 1500 can be performed by or using any suitable computing device, computing system or any number of computing devices or systems that may cooperate to perform the method 1500. In some implementations, each of the blocks of the method 1500 can be performed wholly or partially by or using the database system 16 of FIGS. 1A and 1B, or other suitable devices or components (including processors) described herein, or the like.

In block 1502, a group member, for example, a group creator or owner, creates a group or accesses an existing group. For example, a user could create the Test Record Group using the New Group button 1446 as described above. Alternatively, the user could select the Test Record Group using the Groups Tab 1408 as described above. In block 1504, the database system 16 causes the group page interface for the created or accessed group to be displayed (for example, interface 1400 of FIG. 14). In block 1506, the user (the group creator or other group member or user authorized to subscribe the group to a record) selects the More button 1444, and within the subsequently displayed pick list, selects the New Record button 1448.

Figure 16:
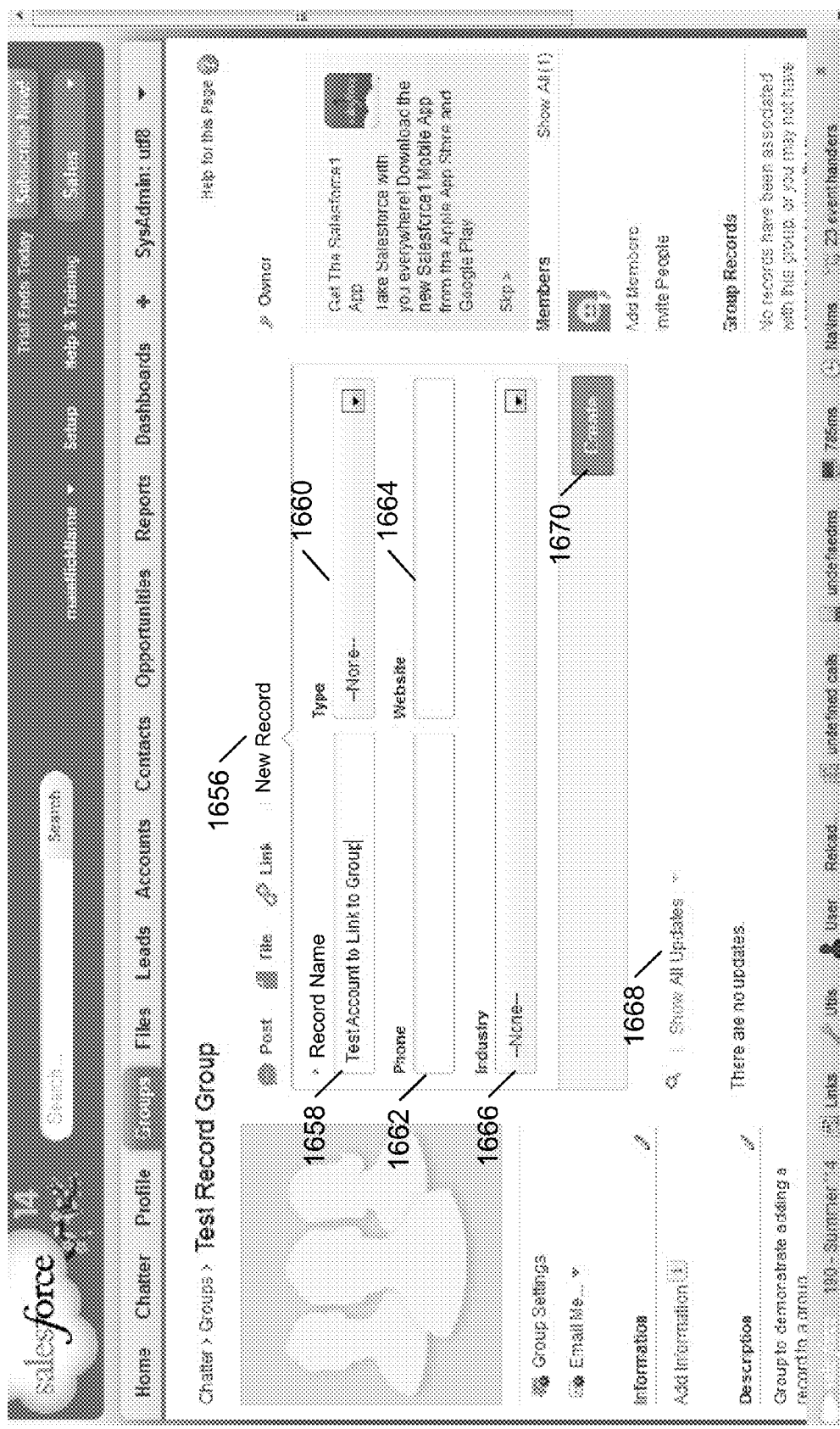
FIG. 16 shows an example of an interface for creating a new record within an enterprise social network according to some implementations.

FIG. 16 shows an example of an interface 1600 for creating a new record within an enterprise social network according to some implementations. In the illustrated example implementation, the interface 1600 is substantially the same as the interface 1400 except that the interface 1600 now includes a "New Record" section or pop-up window 1656. Within the New Record section 1656, the record creator can specify a name for the record in a Record Name input section 1658. In the illustrated example, the record name is specified as "Test Account to Link to Group." The record creator also can specify a type of the record in a Type input section 1660. For example, when the Type input section 1660 is selected a drop down menu or pick list can be displayed that lists the possible record types in the form of buttons or other UI elements the user can select. For purposes of the present example, the user can select or otherwise specify the type of the record as "Account." The user also can specify other data for the record include a phone number, a website, or an industry, among other examples, in sections 1662, 1664 and 1666, respectively. In some implementations, a user also can select which feed items, such as posts or updates, the user wants to be displayed in the record feed for the Test Account to Link to Group record or in the group feed for the Test Record Group. For example, the user can select a drop down menu or pick list 1668 where the user can select to receive all feed items/updates (as indicated) or to receive only certain feed items submitted by, or resulting from activity by, only selected users or groups of users. In block 1508, the user selects or inputs the record name and record type using sections 1658 and 1660 as well as additional data if desired at the time of creation.

In block 1510, the user saves the record by, for example, clicking or selecting a "Create" button 1670. Upon selecting the Create button 1670, the new record (for example, Test Account to Link to Group) is saved by the database system 16. For example, the new record can be saved in the Records Table 900 of FIG. 9. Furthermore, because the new record (Test Account to Link to Group) was created by a user from a group page (the Test Record Group), the database system 16 automatically subscribes the group with the new record via the Groups—Record Table 1300 of FIG. 13.

Figure 17:
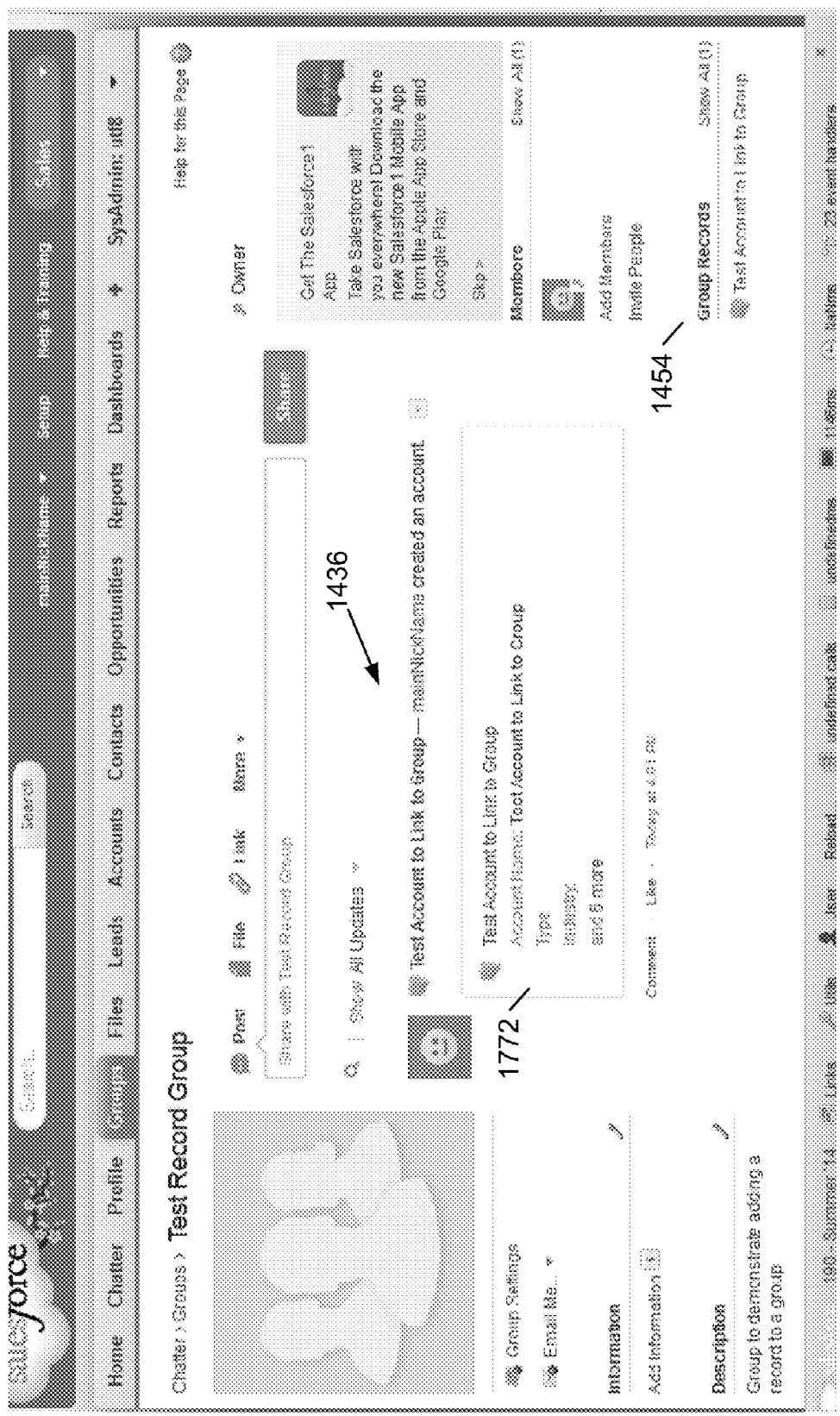
FIG. 17 shows an example of an interface showing a group feed for a group and a record subscribed to by the group according to some implementations.

Additionally, because the group is now subscribed to the record, when a group member of the group (for example, the Test Record Group) accesses the Test Record Group via, for example, the Groups Tab 1408, the record (Test Account to Link to Group) now appears in the Group Records section 1454 as shown in the interface 1700 of FIG. 17. In some implementations, the list of records subscribed to by the group and displayed in the Group Records section 1454 takes the form of a list of record hyperlinks that can be selected by any member of the group. In some implementations, upon a user selecting (for example, "clicking") on a record hyperlink in the list, the home page for the record is then displayed. Interface 1700 also shows the group feed 1436 for the Test Record Group. For example, as shown, the group feed 1436 shows a feed item 1772 indicating that the user (for example, "mainNickName") created a record account having the name Test Account to Link to Group. In some implementations, the record feed for the Test Account to Link to Group record also shows this or a similar feed item.

Figure 18:
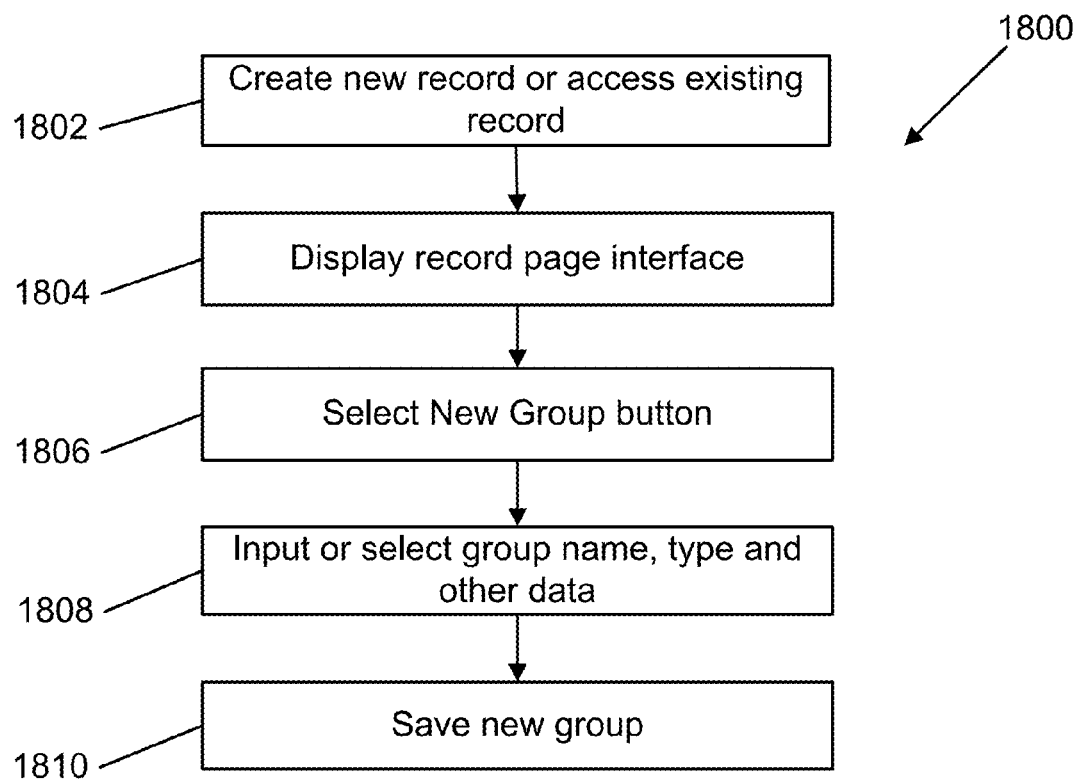
FIG. 18 shows a flowchart of an example of a computer-implemented method for associating a record in an enterprise network to a group according to some implementations.

As described above, in some implementations, a user accessing a particular record page the user is subscribed to also can create a group to be subscribed to the record or select an existing group to be subscribed to the record in a similar manner as that just described with reference to FIGS. 14-17. FIG. 18 shows a flowchart of an example of a computer-implemented method 1800 for associating a record in an enterprise network to a group according to some implementations. The method 1800 can be performed by or using any suitable computing device, computing system or any number of computing devices or systems that may cooperate to perform the method 1800. In some implementations, each of the blocks of the method 1800 can be performed wholly or partially by or using the database system 16 of FIGS. 1A and 1B, or other suitable devices or components (including processors) described herein, or the like.

In block 1802, a user, for example, a record creator or owner, creates a record or accesses an existing record. For example, a user could create the record using the New Record button 1448 as described above. Alternatively, the user could select an existing record using, for example, the Files tab 1410, Leads tab 1412, Accounts tab 1414, Opportunities tab 1418, Reports tab 1420 or the "+" tab 1424 to create or select a different type of record. In block 1804, the database system 16 causes an interface to be displayed to the user, similar to the interface 1400 but configured to display information about the record. In block 1806, the user (the record creator or other user authorized to subscribe a group to the record) selects the New Group button 1448. In block 1808, the user selects or inputs the group name and group type as well as additional information if desired at the time of creation.

In block 1810, the user clicks or selects a create or save button. Upon selecting the create button, the new group is saved by the database system 16. For example, the new group can be saved in the Groups Table 800 of FIG. 8. Furthermore, because the new group was created by a user from a record page, the database system 16 automatically subscribes the new group to the record via the Groups—Record Table 1300 of FIG. 13. Additionally, because the group is now subscribed to the record, when a group member of the group accesses the group via, for example, the Groups Tab 1408, the record would now appear in the Group Records section 1454 and the group feed for the group (for example, group feed 1436) would include feed items generated for the record feed of the record.

Figure 19:
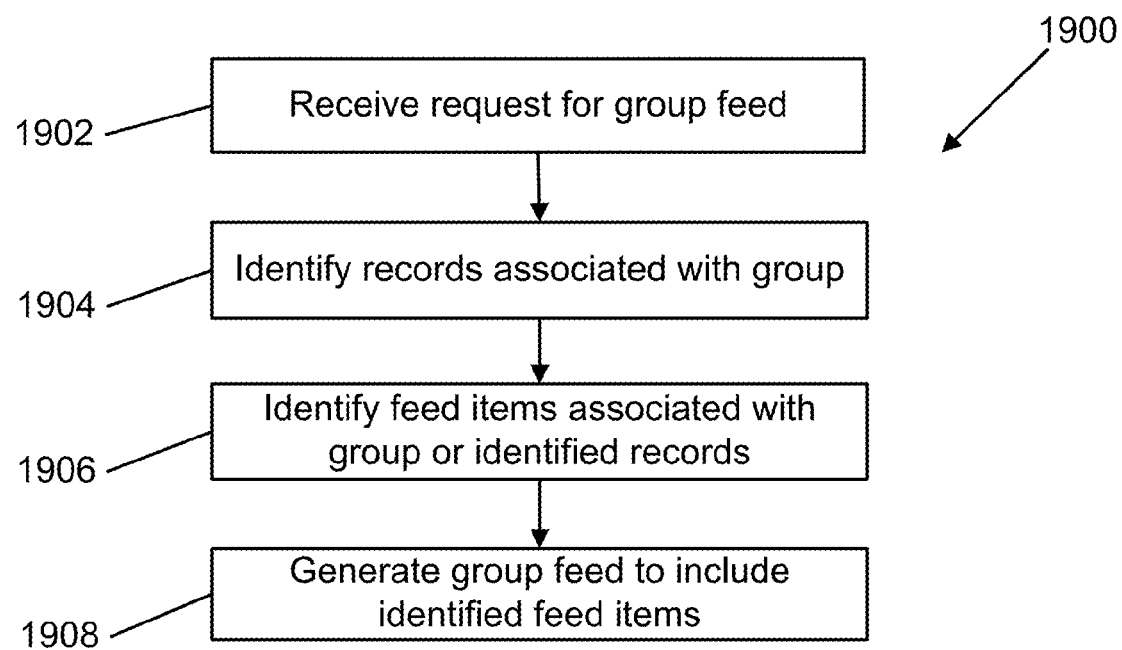
FIG. 19 shows a flowchart of an example of a computer-implemented method for generating a group feed to include feed items from one or more associated records according to some implementations.

IX. Generating a Group Feed Including Feed Items from One or More Associated Records FIG. 19 shows a flowchart of an example of a computer-implemented method 1900 for generating a group feed to include feed items from one or more associated records according to some implementations. The method 1900 can be performed by or using any suitable computing device, computing system or any number of computing devices or systems that may cooperate to perform the method 1900. In some implementations, each of the blocks of the method 1900 can be performed wholly or partially by or using the database system 16 of FIGS. 1A and 1B, or other suitable devices or components (including processors) described herein, or the like.

In block 1902, the system receives a request for a group feed associated with a particular group. For example, the request for the group feed could be made in response to a user that is a member of the group accessing the home or profile page of the group. As described above, the group and corresponding feed can be identified by a unique group identifier; for example, GroupID G111 in, for example, the Groups Table 800 of FIG. 8. In block 1904, the system identifies one or more records subscribed to by the group. For example, to identify the records, the system could access the Group-Record Table 1300 of FIG. 13 and search the Group-Record Table 1300 for all the record identifiers (in the illustrated example, RecordIDs R111 and R112) associated with the group identifier (GroupID G111) of the group.

In block 1906, the system identifies one or more feed items associated with the group identifier of the group (GroupID G111) or with the one or more record identifiers (RecordIDs R111 and R112) identified in block 1904. For example, to identify the feed items, the system could access the Feed Item Table 1200 of FIG. 12 and search the Feed Item Table 1200 for all the feed item identifiers, in the illustrated example, FeedItemIDs F111, F112 and F113, originating from feeds associated with ParentIDs R112, R111 and G111, respectively. In block 1908, the system generates the group feed to include the identified feed items (for example, F111, F112 and F113).

Figure 20:
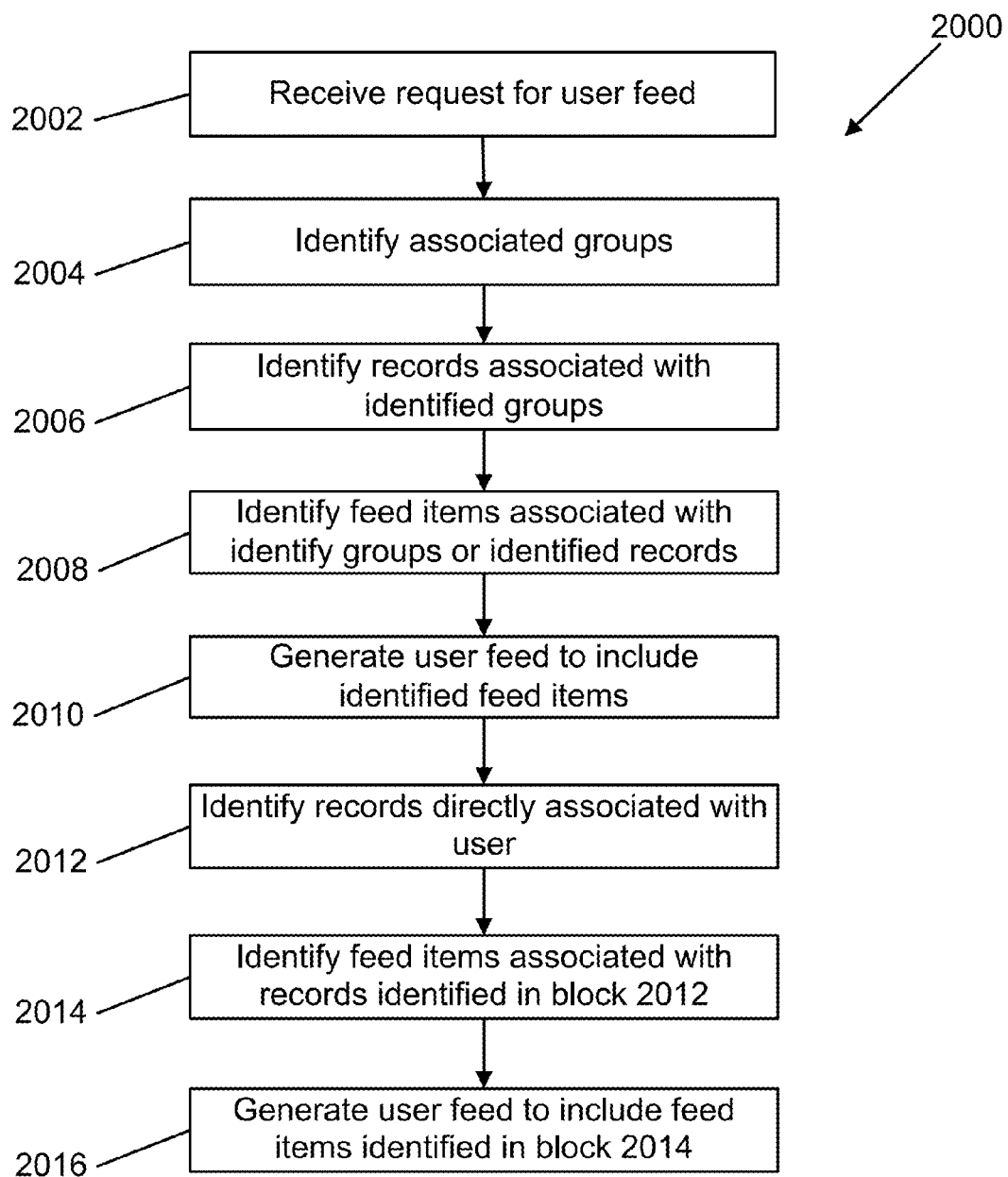
FIG. 20 shows a flowchart of an example of a computer-implemented method for generating a user feed to include feed items from one or more associated groups or one or more associated records according to some implementations.

X. Generating a User Feed Including Feed Items from One or More Linked Groups and Linked Records FIG. 20 shows a flowchart of an example of a computer-implemented method for generating a user feed to include feed items from one or more associated groups or one or more associated records according to some implementations. The method 2000 can be performed by or using any suitable computing device, computing system or any number of computing devices or systems that may cooperate to perform the method 2000. In some implementations, each of the blocks of the method 2000 can be performed wholly or partially by or using the database system 16 of FIGS. 1A and 1B, or other suitable devices or components (including processors) described herein, or the like.

In block 2002, the system receives a request for a user feed associated with a particular user. For example, the request for the user feed could be made in response to a user accessing his or her home or user profile page. As described above, the user and corresponding feed can be identified by a unique user identifier; for example, UserID U111 in, for example, the Users Table 700 of FIG. 7. In block 2004, the system identifies one or more groups the user is subscribed to. For example, to identify the groups, the system could access the Group-User Table 1000 of FIG. 10 and search the Group-User Table 1000 for all the group identifiers (in the illustrated example, GroupIDs G111 and G112) associated with the user identifier (U111).

In block 2006, the system identifies one or more records the groups identified in block 2004 are subscribed to. For example, to identify the records, the system could access the Group-Record Table 1300 of FIG. 13 and search the Group-Record Table 1300 for all the record identifiers associated with the identified group identifiers (GroupIDs G111 and G112). In the illustrated example, the identified records are associated with RecordIDs R111 and R112. In block 2008, the system identifies one or more feed items associated with the group identifier of the group (GroupID G111) or with the one or more record identifiers (RecordIDs R111 and R112) identified in block 2006. For example, to identify the feed items, the system could access the Feed Item Table 1200 of FIG. 12 and search the Feed Item Table 1200 for all the feed item identifiers, in the illustrated example, FeedItemIDs F111, F112 and F113, originating from feeds associated with ParentIDs R112, R111 and G111, respectively. In block 2010, the system generates the user feed to include the identified feed items (for example, F111, F112 and F113).

In some implementations, the method 2000 further includes, in block 2012, identifying one or more records the user is directly subscribed (not by way of a group-record subscription as described above). For example, to identify the records, the system could access the Record-User Table 1100 of FIG. 11 and search the Record-User Table 1100 for all the record identifiers (in the illustrated example, RecordID R312) associated with the user identifier (U111). In block 2014, the system identifies one or more feed items associated with the record identifiers (RecordID R312) identified in block 2012. For example, to identify the feed items, the system could access the Feed Item Table 1200 of FIG. 12 and search the Feed Item Table 1200 for all the feed item identifiers (in the illustrated example, FeedItemID F214) originating from the feeds associated with the identified records (ParentID R312). In block 2016, the system generates the user feed to also include these identified feed items (F214). It should also be appreciated that, in some implementations, the series of blocks 2004-2010 can be performed in parallel or concurrently with the series of blocks 2012-2016.

The specific details of the specific aspects of implementations disclosed herein may be combined in any suitable manner without departing from the spirit and scope of the disclosed implementations. However, other implementations may be directed to specific implementations relating to each individual aspect, or specific combinations of these individual aspects. Additionally, while the disclosed examples are often described herein with reference to an implementation in which an on-demand database service environment is implemented in a system having an application server providing a front end for an on-demand database service capable of supporting multiple tenants, the present implementations are not limited to multi-tenant databases or deployment on application servers. Implementations may be practiced using other database architectures, i.e., ORACLE®, DB2®, by IBM and the like without departing from the scope of the implementations claimed.

It should also be understood that some of the disclosed implementations can be embodied in the form of control logic using hardware or using computer software in a modular or integrated manner. Other ways or methods are possible using hardware and a combination of hardware and software. Additionally, any of the software components or functions described in this application may be implemented as software code to be executed by one or more processors using any suitable computer language such as, for example, Java, C++ or Perl using, for example, existing or object-oriented techniques. The software code may be stored as a series of instructions or commands on a computer-readable medium for storage or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer-readable medium may be any combination of such storage or transmission devices. Computer-readable media encoded with the software/program code may be packaged with a compatible device or provided separately from other devices (for example, via Internet download). Any such computer-readable medium may reside on or within a single computing device or an entire computer system, and may be among other computer-readable media within a system or network. A computer system, or other computing device, may include a monitor, printer, or other suitable display for providing any of the results mentioned herein to a user.

While various implementations have been described herein, it should be understood that they have been presented by way of example only, and not limitation. Thus, the breadth and scope of the present application should not be limited by any of the implementations described herein, but should be defined only in accordance with the following and later-submitted claims and their equivalents.

What is claimed is:

1. A computer-implemented method for associating feed items to a group of users of an enterprise network, the method comprising:

receiving, by one or more computer systems, a request for a first group feed, the first group feed being associated with a first group of users of the enterprise network, the first group of users being identified by a first group identifier, the request being associated with the first group identifier;

identifying one or more first record identifiers associated with the first group identifier using a first data object, the first data object associating each of a plurality of group identifiers including the first group identifier to one or more record identifiers, each group identifier in the first data object identifying a respective group of users of the enterprise network, each record identifier in the first data object identifying a respective record to which a group is subscribed, each of the one or more first record identifiers identifying a respective record to which the first group of users is subscribed;

identifying one or more first feed item identifiers associated with the first group identifier or with the one or more first record identifiers using second data, each of the one or more first feed item identifiers identifying a respective first feed item; and generating the first group feed to include the first feed items.

2. The computer-implemented method of claim 1, wherein the second data includes a second data object associating each of a plurality of feed item identifiers to a respective group identifier or to a respective record identifier, each feed item identifier in the second data object identifying a respective feed item.

3. The computer-implemented method of claim 1, wherein each group has an associated group feed and wherein each record has an associated record feed.

4. The computer-implemented method of claim 3, wherein the respective first group identifier or the respective first record identifier associated with each of the first feed item identifiers in the second data is associated with the group feed or the record feed, respectively, from which the associated first feed item originated.

5. A computer-implemented method for associating feed items to a user of an enterprise network, the method comprising:

receiving, by one or more computer systems, a request for a first user feed, the first user feed being associated with a first user of the enterprise network, the first user being identified by a first user identifier, the request being associated with the first user identifier;

identifying one or more first group identifiers associated with the first user identifier using a first data object, the first data object associating each of a plurality of group identifiers to one or more user identifiers including the first user identifier, each user identifier in the first data object identifying a respective user of the enterprise network, each group identifier identifying a respective group of users to which a user is subscribed, each of the one or more first group identifiers identifying a respective one of one or more first groups of users to which the first user is subscribed;

identifying one or more first record identifiers associated with the one or more first group identifiers using a second data object, the second data object associating each of a plurality of group identifiers to one or more record identifiers, each group identifier in the second data object identifying a respective group of users of the enterprise network, each record identifier in the second data object identifying a respective record to which a group of users is subscribed, each of the one or more first record identifiers identifying a respective one of one or more first records to which one or more of the first groups of users associated with the one or more first group identifiers is subscribed;

identifying one or more first feed item identifiers associated with the one or more first group identifiers or with the one or more first record identifiers using third data, each of the one or more first feed item identifiers identifying a respective first feed item; and generating the first user feed to include the first feed items.

6. The computer-implemented method of claim 5, wherein the third data includes a third data object associating each of a plurality of feed item identifiers to a respective group identifier or to a respective record identifier, each feed item identifier in the third data object identifying a respective feed item.

7. The computer-implemented method of claim 5, wherein each group has an associated group feed and wherein each record has an associated record feed.

8. The computer-implemented method of claim 7, wherein the respective first group identifier or the respective first record identifier associated with each of the first feed item identifiers in the third data is associated with the group feed or the record feed, respectively, from which the associated first feed item originated.

9. The computer-implemented method of claim 5, further including:

identifying one or more second record identifiers associated with the first user identifier using fourth data, each of the one or more second record identifiers identifying a respective record to which the first user is subscribed;

identifying one or more second feed item identifiers associated with the one or more second record identifiers using the third data, each of the one or more second feed item identifiers identifying a respective second feed item; and generating the first user feed to include the second feed items.

10. The computer-implemented method of claim 9, wherein the fourth data includes a fourth data object associating each of a plurality of record identifiers to one or more user identifiers, each record identifier in the fourth data object identifying a respective record to which a user is subscribed.

11. A system for associating feed items from one or more feeds to a user or group of users of an enterprise network, the system comprising:

one or more processors;

one or more storage devices storing:

data, the data including:

a first data object associating each of a plurality of group identifiers to one or more record identifiers, each group identifier in the first data object identifying a respective group of users of the enterprise network, each record identifier identifying a respective record to which a group is subscribed, and second data associating each of a plurality of feed item identifiers to a respective group identifier or to a respective record identifier, each feed item identifier identifying a respective feed item; and instructions that, when executed by the one or more processors, are configured to cause operations to be performed including:

receiving a request for a first group feed, the first group feed being associated with a first group of users of the enterprise network, the first group of users being identified by a first group identifier, the request being associated with the first group identifier, identifying one or more first record identifiers associated with the first group identifier using the first data object, each of the one or more first record identifiers identifying a respective record to which the first group of users is subscribed, identifying one or more first feed item identifiers associated with the first group identifier or with the one or more first record identifiers using the second data, each of the one or more first feed item identifiers identifying a respective first feed item, and generating the first group feed to include the first feed items.

12. The system of claim 11, wherein the second data includes a second data object associating each of the plurality of feed item identifiers to the respective group identifier or to the respective record identifier.

13. The system of claim 11, wherein each group has an associated group feed and wherein each record has an associated record feed.

14. The system of claim 13, wherein the respective first group identifier or the respective first record identifier associated with each of the first feed item identifiers in the second data is associated with the group feed or the record feed, respectively, from which the feed item originated.

15. A system for associating feed items from one or more feeds to a user or group of users of an enterprise network, the system comprising:
one or more processors;
one or more storage devices storing:
data, the data including:
a first data object associating each of a plurality of group identifiers to one or more user identifiers, each user identifier in the first data object identifying a respective user of the enterprise network, each group identifier identifying a respective group of users to which a user is subscribed,
a second data object associating each of a plurality of group identifiers to one or more record identifiers, each group identifier in the second data object identifying a respective group of users of the enterprise network, each record identifier identifying a respective record to which a group is subscribed, and
third data associating each of a plurality of feed item identifiers to a respective group identifier or to a respective record identifier, each feed item identifier identifying a respective feed item; and
instructions that, when executed by the one or more processors, are configured to cause operations to be performed including:
receiving a request for a first user feed, the first user feed being associated with a first user of the enterprise network, the first user being identified by a first user identifier, the request being associated with the first user identifier, identifying one or more first group identifiers associated with the first user identifier using the first data object, each of the one or more first group identifiers identifying a respective one of one or more first groups to which the first user is subscribed, identifying one or more first record identifiers associated with the one or more first group identifiers using the second data object, each of the one or more first record identifiers identifying a respective record to which a respective one of the one or more first groups of users is subscribed, identifying one or more first feed item identifiers associated with the one or more first group identifiers or with the one or more first record identifiers using the third data, each of the one or more first feed item identifiers identifying a respective first feed item, and generating the first user feed to include the first feed items.

16. The system of claim 15, wherein the third data includes a third data object associating each of a plurality of feed item identifiers to a respective group identifier or to a respective record identifier, each feed item identifier identifying a respective feed item.

17. The system of claim 15, wherein each group has an associated group feed and wherein each record has an associated record feed.

18. The system of claim 17, wherein the respective first group identifier or the respective first record identifier associated with each of the first feed item identifiers in the third data is associated with the group feed or the record feed, respectively, from which the associated first feed item originated.

19. The system of claim 15, wherein:
the data further includes fourth data associating each of a plurality of record identifiers to one or more user identifiers, each record identifier identifying a respective record to which a user is subscribed; and
the instructions, when executed by the one or more processors, are further configured to cause operations including:
identifying one or more second record identifiers associated with the first user identifier using the fourth data, identifying one or more second feed item identifiers associated with the one or more second record identifiers using the third data, each of the one or more second feed item identifiers identifying a respective second feed item, and generating the first user feed to include the second feed items.

* * * * *